United States Patent
Im et al.

(10) Patent No.: US 12,236,034 B2
(45) Date of Patent: Feb. 25, 2025

(54) TRANSPARENT DISPLAY DEVICE

(71) Applicant: LG Display Co., Ltd., Seoul (KR)

(72) Inventors: Jonghyeok Im, Paju-si (KR); JaeHee Park, Paju-si (KR); MiReum Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/624,885

(22) Filed: Apr. 2, 2024

(65) Prior Publication Data
US 2024/0248558 A1 Jul. 25, 2024

Related U.S. Application Data

(63) Continuation of application No. 17/977,882, filed on Oct. 31, 2022, now Pat. No. 11,977,697.

(30) Foreign Application Priority Data

Dec. 15, 2021 (KR) .................. 10-2021-0179648

(51) Int. Cl.
*G06F 3/041* (2006.01)
*G06F 3/044* (2006.01)

(52) U.S. Cl.
CPC .......... *G06F 3/0412* (2013.01); *G06F 3/0416* (2013.01); *G06F 3/044* (2013.01)

(58) Field of Classification Search
CPC ....... G06F 3/0412; G06F 3/0416; G06F 3/044
USPC .................................................. 345/173–174
See application file for complete search history.

(56) References Cited

U.S. PATENT DOCUMENTS

| | | | |
|---|---|---|---|
| 11,249,580 B2* | 2/2022 | Huang | G06F 3/0412 |
| 2015/0301658 A1* | 10/2015 | Saucedo | G06F 3/0446 |
| | | | 345/174 |
| 2015/0378486 A1* | 12/2015 | Yu | G06F 3/04164 |
| | | | 427/79 |
| 2017/0205932 A1* | 7/2017 | Yang | G06F 3/0412 |
| 2018/0004338 A1* | 1/2018 | Khazeni | G06F 3/041 |
| 2019/0163313 A1* | 5/2019 | Kim | G06F 3/0412 |
| 2021/0242284 A1* | 8/2021 | Kim | H10K 71/00 |

FOREIGN PATENT DOCUMENTS

KR 20170033496 A 3/2017

* cited by examiner

*Primary Examiner* — Kwin Xie
(74) *Attorney, Agent, or Firm* — Seed IP Law Group LLP

(57) ABSTRACT

A transparent display device is provided, which may reduce or minimize loss of light transmittance due to a touch sensor and a touch line, and may detect a defective touch sensor. The device includes a substrate provided with a plurality of transmissive areas and a non-transmissive area, a plurality of touch sensors respectively provided in the plurality of transmissive areas, including a touch sensor electrode, a plurality of pixels provided in the non-transmissive area, including a plurality of subpixels, a plurality of driving transistors respectively connected to the plurality of subpixels, a plurality of touch transistors respectively connected to the plurality of touch sensors, and a reference line applying a reference voltage to the plurality of driving transistors in accordance with a control signal or transferring a voltage of each of the plurality of touch sensors to an analog-to-digital converter through the plurality of touch transistors.

16 Claims, 16 Drawing Sheets

TRANSPARENT DISPLAY DEVICE

CROSS-REFERENCE TO RELATED APPLICATION(S)

This application is a continuation of U.S. patent application Ser. No. 17/977,882, filed Oct. 31, 2022; and Korean Patent Application No. 10-2021-0179648, filed on Dec. 15, 2021; the disclosures of which are incorporated herein by reference.

BACKGROUND

Technical Field

The present disclosure relates to a transparent display device.

Description of the Related Art

Recently, studies for a transparent display device in which a user may view objects or images positioned at an opposite side through the display device are actively ongoing. The transparent display device includes a display area on which an image is displayed, wherein the display area may include a transmissive area capable of transmitting external light and a non-transmissive area, and may have high light transmittance through the transmissive area.

A transparent display device may be provided with a plurality of touch sensors and a plurality of touch lines to implement a touch function.

BRIEF SUMMARY

However, the inventors have realized that the transparent display device in the related art has technical problems in that it is not easy to form the plurality of touch sensors and the plurality of touch lines, or the formation process is complicated. Further problems include light transmittance being reduced due to the plurality of touch sensors and the plurality of touch lines. The present disclosure has been made in view of the various technical problems in the related art including the above identified problems.

One or more embodiments of the present disclosure provide a transparent display device that may reduce or minimize loss of light transmittance due to a touch sensor and a touch line.

One or more embodiments of the present disclosure provide a transparent display device that may detect a defective touch sensor.

In addition to the technical benefits of the present disclosure as mentioned above, additional benefits and features of the present disclosure will be clearly understood by those skilled in the art from the following description of the present disclosure.

In accordance with an aspect of the present disclosure, the above and other objects can be accomplished by the provision of a transparent display device comprising a substrate provided with a plurality of transmissive areas and a non-transmissive area disposed between the transmissive areas adjacent to each other, a plurality of touch sensors respectively provided in the plurality of transmissive areas over the substrate, including a touch sensor electrode, a plurality of pixels provided in the non-transmissive area over the substrate, including a plurality of subpixels, a plurality of driving transistors respectively connected to the plurality of subpixels, a plurality of touch transistors respectively connected to the plurality of touch sensors, and a reference line applying a reference voltage to the plurality of driving transistors in accordance with a control signal or transferring a voltage of each of the plurality of touch sensors to an analog-to-digital (AD) converter through the plurality of touch transistors.

In accordance with another aspect of the present disclosure, the above and other objects can be accomplished by the provision of a transparent display device comprising a substrate provided with a plurality of transmissive areas and a non-transmissive area including a plurality of light emission areas, a plurality of touch sensors respectively provided in the plurality of transmissive areas over the substrate, including a touch sensor electrode, a plurality of light emitting elements respectively provided in the plurality of light emitting areas over the substrate, including an anode electrode, a light emitting layer and a cathode electrode, a plurality of first touch connection portions connecting the plurality of touch sensors with a first signal line and including a touch transistor, and a plurality of touch connection portions connecting the plurality of touch sensors with a second signal line and including a high resistance area.

BRIEF DESCRIPTION OF THE SEVERAL VIEWS OF THE DRAWINGS

The above and other objects, features and other advantages of the present disclosure will be more clearly understood from the following detailed description taken in conjunction with the accompanying drawings, in which.

DETAILED DESCRIPTION

Figure 1:
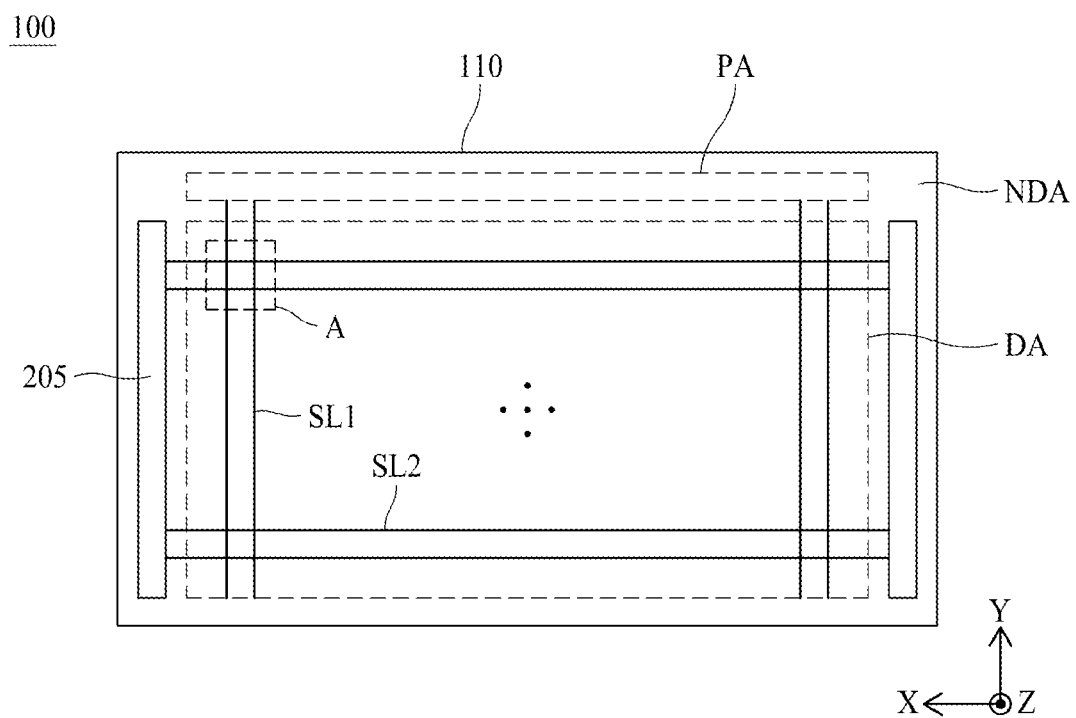
FIG. 1 is a schematic plan view illustrating a transparent display panel.

Advantages and features of the present disclosure, and implementation methods thereof will be clarified through following embodiments described with reference to the accompanying drawings. The present disclosure may however, be embodied in different forms and should not be construed as limited to the embodiments set forth herein. Rather, these embodiments are provided so that this disclosure will be thorough and complete, and will fully convey the scope of the present disclosure to those skilled in the art. A shape, a size, dimensions (e.g., length, width, height, thickness, radius, diameter, area, etc.), a ratio, an angle, and a number of elements disclosed in the drawings for describing embodiments of the present disclosure are merely an example, and thus, the present disclosure is not limited to the illustrated details.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

Like reference numerals refer to like elements throughout the specification. In the following description, when the detailed description of the relevant known function or configuration is determined to unnecessarily obscure the important point of the present disclosure, the detailed description will be omitted. In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~,' 'above~,' 'below~,' and 'next to~,' one or more portions may be arranged between two other portions unless 'just' or 'direct' is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," etc., may be used. These terms are intended to identify the corresponding elements from the other elements, and basis, order, or number of the corresponding elements are not limited by these terms. The expression that an element is "connected" or "coupled" to another element should be understood that the element may directly be connected or coupled to another element but may directly be connected or coupled to another element unless specially mentioned, or a third element may be interposed between the corresponding elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

FIG. 1 is a schematic plan view illustrating a transparent display panel.

Hereinafter, X axis indicates a line parallel with a scan line, Y axis indicates a line parallel with a data line, and Z axis indicates a height direction of a transparent display device 100.

Although a description has been described based on that the transparent display device 100 according to one embodiment of the present disclosure is embodied as an organic light emitting display device, the transparent display device 100 may be embodied as a liquid crystal display device, a plasma display panel (PDP), a Quantum dot Light Emitting Display (QLED) or an Electrophoresis display device.

Referring to FIG. 1, a transparent display device according to one embodiment of the present disclosure includes a transparent display panel 110. The transparent display panel 110 may include a display area DA provided with pixels to display an image, and a non-display area NDA for not displaying an image.

The display area DA may be provided with a first signal lines SL1, a second signal lines SL2 and the pixels. The non-display area NDA may be provided with a pad area PA in which pads are disposed, and at least one scan driver 205.

The first signal lines SL1 may be extended in a first direction (e.g., Y-axis direction). The first signal lines SL1 may cross the second signal lines SL2 in the display area DA. The second signal lines SL2 may be extended in the display area DA in a second direction (e.g., X-axis direction). The pixel may be provided in an area where the first signal line SL1 and the second signal line SL2 cross each other, and emits predetermined light to display an image.

The scan driver 205 are connected to the scan lines and supplies scan signals to the scan lines. The scan driver 205 may be disposed in the non-display area NDA on one side or both sides of the display area DA of the transparent display panel 110 by a gate driver in panel (GIP) method or a tape automated bonding (TAB) method.

The transparent display panel 110 may further include a touch line and a touch sensor in addition to the first signal line SL1, the second signal line SL2 and the pixel in order to implement a touch function. A detailed description of the touch line and the touch sensor will be described later with reference to FIGS. 2 to 16.

Figure 2:
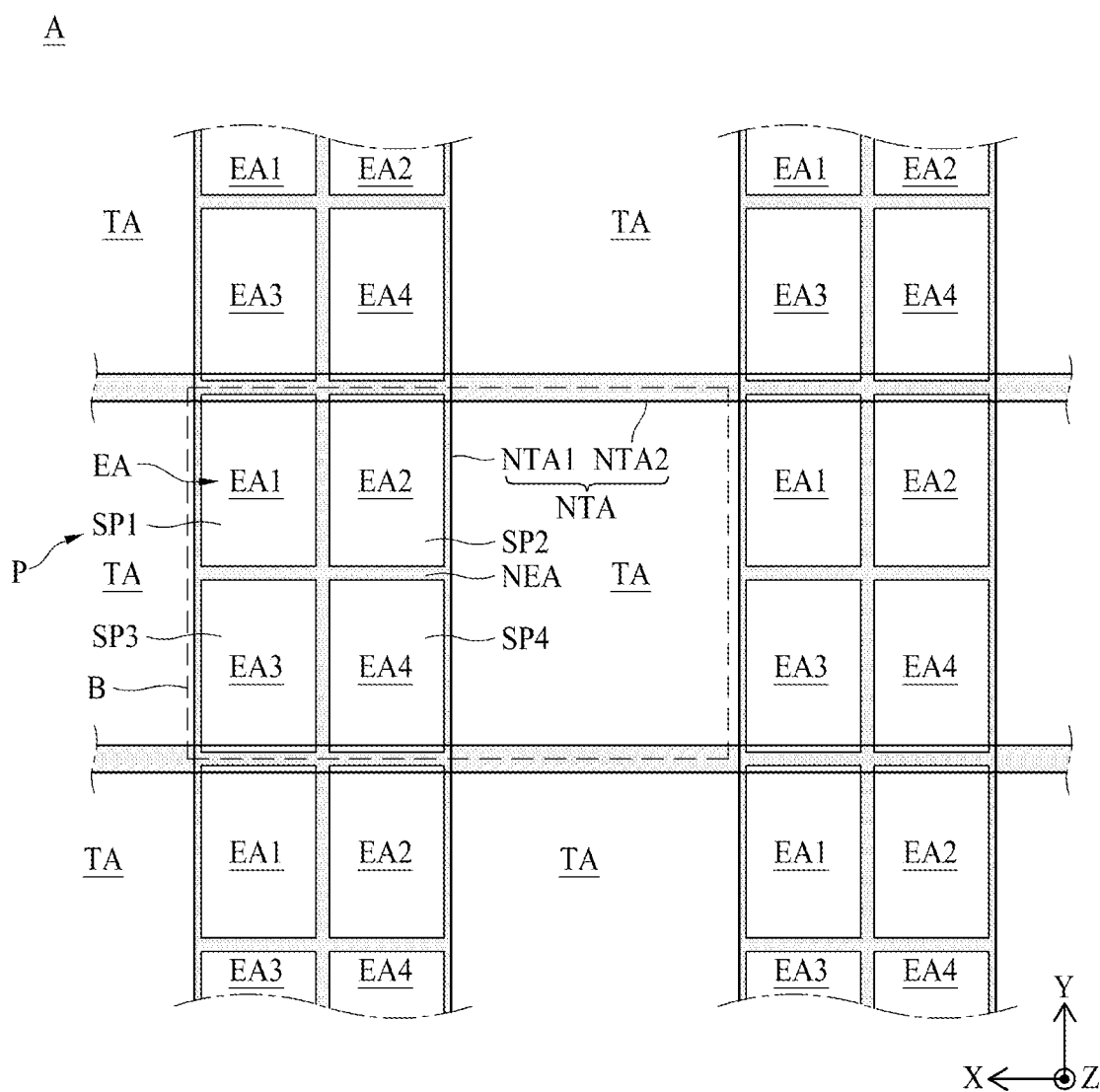
FIG. 2 is a schematic view illustrating an example of a pixel provided in an area A of FIG. 1.
Figure 3:
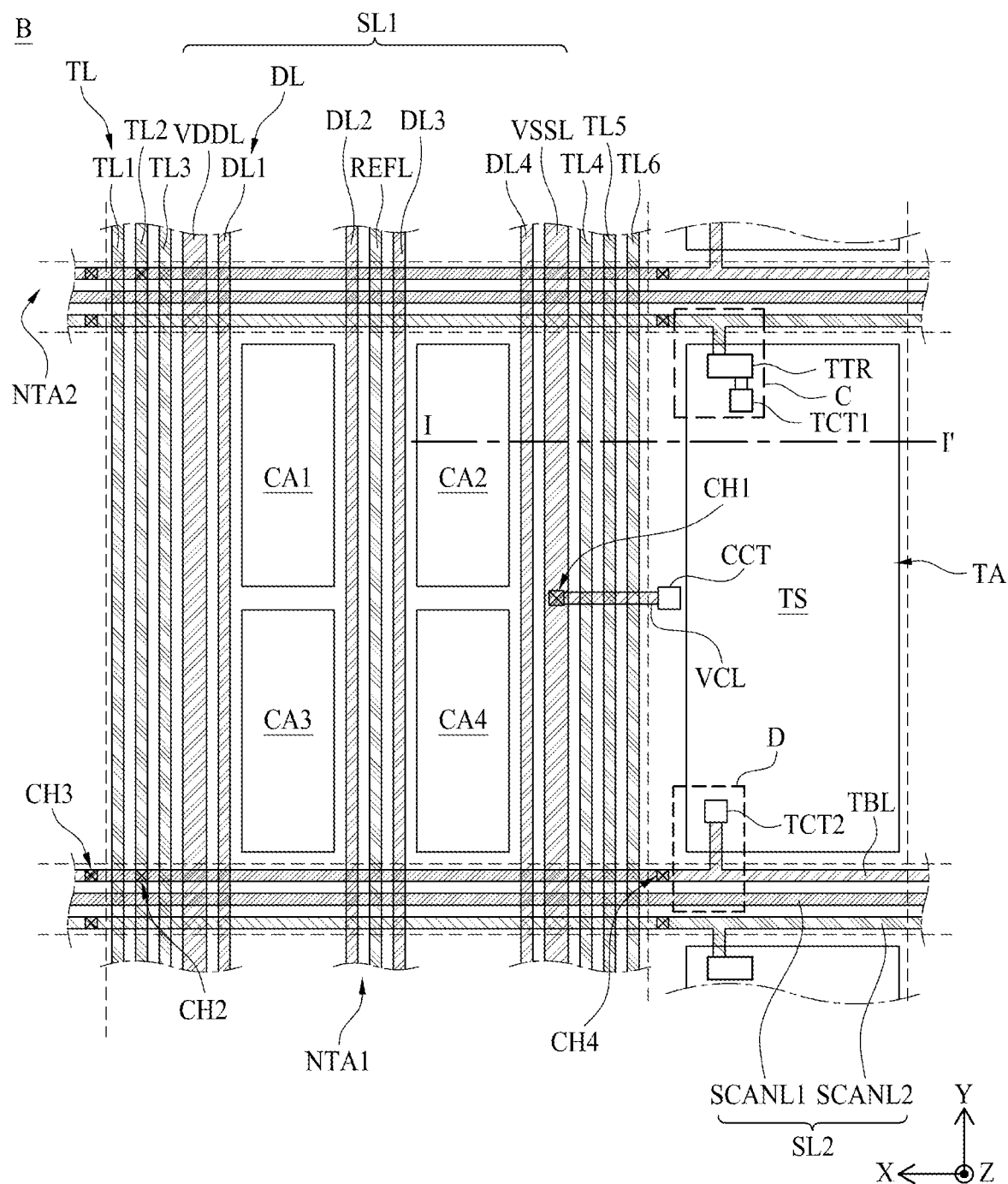
FIG. 3 is a view illustrating an example of signal lines, touch lines and a touch sensor, which are provided in an area B of FIG. 2.

FIG. 2 is a schematic view illustrating an example of a pixel provided in an area A of FIG. 1, and FIG. 3 is a view illustrating an example of signal lines, touch lines and a touch sensor, which are provided in an area B of FIG. 2.

The display area DA, as shown in FIG. 2, includes a transmissive area TA and a non-transmissive area NTA. The transmissive area TA is an area through which most of externally incident light passes, and the non-transmissive area NTA is an area through which most of externally incident light fails to transmit. For example, the transmissive area TA may be an area where light transmittance is greater than $\alpha$ %, for example, about 90%, and the non-transmissive area NTA may be an area where light transmittance is smaller than $\beta$ %, for example, about 50%. At this time, $\alpha$ is greater than $\beta$. A user may view an object or background arranged over a rear surface of the transparent display panel 110 due to the transmissive area TA.

The non-transmissive area NTA may include a first non-transmissive area NTA1, a second non-transmissive area NTA2 and a plurality of pixels P. Pixels P may be provided to at least partially overlap at least one of the first signal line SL1 and the second signal line SL2, thereby emitting predetermined light to display an image. A light emission area EA may correspond to an area, from which light is emitted, in the pixel P.

Each of the pixels P, as shown in FIG. 2, may include at least one of a first subpixel SP1, a second subpixel SP2, a third subpixel SP3 and a fourth subpixel SP4. The first subpixel SP1 may include a first light emission area EA1 emitting light of a first color. The second subpixel SP2 may include a second light emission area EA2 emitting light of a second color. The third subpixel SP3 may include a third light emission area EA3 emitting light of a third color. The fourth subpixel SP4 may include a fourth light emission area EA4 emitting light of a fourth color.

The first to fourth light emission area EA1, EA2, EA3 and EA4 may emit light of different colors. For example, the first light emission area EA1 may emit light of a green color. The second light emission area EA2 may emit light of a red color. The third light emission area EA3 may emit light of a blue color. The fourth light emission area EA4 may emit light of a white color. However, the light emission areas are not limited to this example. Each of the pixels P may further include a subpixel emitting light of a color other than red, green, blue and white. Also, the arrangement order of the subpixels SP1, SP2, SP3 and SP4 may be changed in various ways.

The first non-transmissive area NTA1 may be extended in a first direction (Y-axis direction) in a display area DA, and may be disposed to at least partially overlap light emission areas EA1, EA2, EA3 and EA4. A plurality of first non-transmissive areas NTA1 may be provided in the transparent display panel 110, and a transmissive area TA may be provided between two adjacent first non-transmissive areas NTA1. In the first non-transmissive area NTA1, first signals lines extended in the first direction (Y-axis direction) and touch lines TL extended in the first direction (Y-axis direction) may be disposed to be spaced apart from each other.

For example, the first signal lines SL1 may include at least one of a pixel power line VDDL, a common power line VSSL, a reference line REFL or data lines DL1, DL2, DL3 and DL4.

The pixel power line VDDL may supply a first power source to a driving transistor DTR of each of subpixels SP1, SP2, SP3 and SP4 provided in the display area DA.

The common power line VSSL may supply a second power source to a cathode electrode of the subpixels SP1, SP2, SP3 and SP4 provided in the display area DA. At this time, the second power source may be a common power source commonly supplied to the subpixels SP1, SP2, SP3 and SP4.

The common power line VSSL may supply the second power source to the cathode electrode through a cathode contact portion CCT provided between the transmissive area TA and the common power line VSSL. A power connection line VCL may be disposed between the common power line VSSL and the cathode contact portion CCT. One end of the power connection line VCL may be connected to the common power line VSSL through a first contact hole CH1 and the other end thereof may be connected to the cathode contact portion CCT. The cathode electrode may be connected to the cathode contact portion CCT. As a result, the cathode electrode may be electrically connected to the common power line VSSL through the power connection line VCL and the cathode contact portion CCT.

The reference line REFL may supply an initialization voltage (or sensing voltage) to the driving transistor DTR of each of the subpixels SP1, SP2, SP3 and SP4 provided in the display area DA. Alternatively, the reference line REFL may sense a voltage of each of the plurality of touch sensors. A detailed description thereof will be provided later.

The reference line REFL may be disposed between the plurality of data lines DL1, DL2, DL3 and DL4. For example, the reference line REFL may be disposed at the center of the plurality of data lines DL1, DL2, DL3 and DL4, that is, between the second data line DL2 and the third data line DL3.

The reference line REFL may be diverged and connected to the plurality of subpixels SP1, SP2, SP3 and SP4. In detail, the reference line REFL may be connected to circuit elements of the plurality of subpixels SP1, SP2, SP3 and SP4 to supply an initialization voltage (or sensing voltage) to each of the subpixels SP1, SP2, SP3 and SP4.

When the reference line REFL is disposed to be close to the edge of the first non-transmissive area NTA1, a deviation between connection lengths from a diverged point to a circuit element of a plurality of subpixels SP1, SP2, SP3 and SP4 is increased. In a transparent display panel 110 according to one embodiment of the present disclosure, the reference line REFL is disposed in a middle area of the first non-transmissive area NTA1, whereby the deviation between the connection lengths to the circuit element of each of the plurality of subpixels SP1, SP2, SP3 and SP4 may be reduced or minimized. Therefore, the reference line REFL may uniformly supply signals to the circuit elements of the plurality of subpixels SP1, SP2, SP3 and SP4.

Each of the data lines DL1, DL2, DL3 and DL4 may supply a data voltage to the subpixels SP1, SP2, SP3 and SP4. For example, the first data line DL1 may supply a first data voltage to a first driving transistor of the first subpixel SP1, the second data line DL2 may supply a second data voltage to a second driving transistor of the second subpixel SP2, the third data line DL3 may supply a third data voltage to a third driving transistor of the third subpixel SP3 and the fourth data line DL4 may supply a fourth data voltage to a fourth driving transistor of the fourth subpixel SP4.

In the transparent display panel 110 according to one embodiment of the present disclosure, the touch line TL may be further disposed in the first non-transmissive area NTA1. At least two touch lines TL may be provided in the first non-transmissive area NTA1. When the plurality of touch lines TL are disposed in the transmissive area TA of the transparent display panel 110, light transmittance may be deteriorated due to the plurality of touch lines TL.

Also, a slit, specifically an elongated linear or rectangular shape, may be provided between the plurality of touch lines TL. When external light passes through the slit, a diffraction phenomenon may occur. According to the diffraction phenomenon, light corresponding to plane waves may be changed to spherical waves as the light passes through the slit, and an interference phenomenon may occur in the spherical waves. Therefore, constructive interference and destructive interference occur in the spherical waves, whereby the external light that has passed through the slit may have irregular light intensity. As a result, in the transparent display panel 110, definition of an object or image positioned at an opposite side may be reduced. For this reason, there is some technical benefits to dispose the plurality of touch lines TL in the first non-transmissive area NTA1 rather than the transmissive area TA.

A plurality of touch lines TL may be disposed between first signal lines SL1 in the first non-transmissive area NTA1 and a transmissive area TA as shown in FIG. 3. For example, six touch lines TL1, TL2, TL3, TL4, TL5 and TL6 may be disposed in one first non-transmissive area NTA1. Three TL1, TL2 and TL3 of the six touch lines TL1, TL2, TL3, TL4, TL5 and TL6 may be disposed between a pixel power line VDDL and the transmissive area TA, and the other three touch lines TL4, TL5 and TL6 may be disposed between a common power line VSSL and the transmissive area TA, but are not limited to this arrangement. The plurality of touch lines TL are required so as not to overlap circuit areas CA1, CA2, CA3 and CA4 in which circuit elements are disposed, and various modifications may be made in the arrangement order of the plurality of touch lines TL with the first signal lines SL1.

The transparent display panel 110 according to one embodiment of the present disclosure includes a pixel P between adjacent transmissive areas TA, and the pixel P may include light emission areas EA1, EA2, EA3 and EA4 in which a light emitting element is disposed to emit light. Since a size of the non-transmissive area NTA is small in the transparent display panel 110, the circuit element may be disposed to at least partially overlap the light emission areas EA1, EA2, EA3 and EA4. That is, the light emission areas EA1, EA2, EA3 and EA4 may include circuit areas CA1, CA2, CA3 and CA4 in which the circuit elements are disposed.

For example, the circuit areas may include a first circuit area CA1 in which a circuit element connected to the first subpixel SP1 is disposed, a second circuit area CA2 in which a circuit element connected to the second subpixel SP2 is disposed, a third circuit area CA3 in which a circuit element connected to the third subpixel SP3 is disposed, and a fourth circuit area CA4 in which a circuit element connected to the fourth subpixel SP4 is disposed.

In the transparent display panel 110 according to one embodiment of the present disclosure, the plurality of touch lines TL do not overlap the circuit areas CA1, CA2, CA3 and CA4, whereby parasitic capacitance of the touch lines TL due to the circuit elements may be reduced or minimized.

Furthermore, the transparent display panel 110 according to one embodiment of the present disclosure may reduce a horizontal distance difference between the touch lines TL. Since at least two transistors and a capacitor are disposed in the circuit areas CA1, CA2, CA3 and CA4, the touch lines TL may be difficult to be formed in a straight line in the circuit areas CA1, CA2, CA3, and CA4, and may be difficult to have a constant horizontal distance. Therefore, the horizontal distance difference between the touch lines TL is increased, whereby uniformity of the parasitic capacitance may be very low.

In the transparent display panel 110 according to one embodiment of the present disclosure, the touch lines TL may be disposed so as not to overlap the circuit areas CA1, CA2, CA3 and CA4, whereby an influence of the circuit element may be reduced and at the same time the horizontal distance difference between the touch lines TL may be reduced to improve uniformity of the parasitic capacitance.

The second non-transmissive area NTA2 may be extended in the display area DA in a second direction (X-axis direction), and may be disposed to at least partially overlap the light emission areas EA1, EA2, EA3 and EA4. A plurality of second non-transmissive areas NTA2 may be provided in the transparent display panel 110, and the transmissive area TA may be provided between two adjacent second non-transmissive areas NTA2. The second signal line SL2 and a touch bridge line TBL may be disposed to be spaced apart from each other in the second non-transmissive area NTA2.

A second signal line SL2 may be extended in a second direction (X-axis direction), and may include, for example, a first scan line SCANL1 and a second scan line SCANL2. The first scan line SCANL1 may supply a first scan signal to the subpixels SP1, SP2, SP3 and SP4 of the pixel P. The second scan line SCANL2 may supply a second scan signal to touch transistors TTR.

A touch bridge line TBL may connect any one of the plurality of touch lines TL with a touch sensor TS. The touch bridge line TBL may be connected to any one of the plurality of touch lines TL through a second contact hole CH2. Further, the touch bridge line TBL may be connected to at least two touch sensors TS extended in the second direction (X-axis direction) while being extended in the second direction (X-axis direction).

In one embodiment, the touch bridge line TBL may include a plurality of layers, e.g., two layers. The touch bridge line TBL may include a first touch bridge line disposed in a first layer in an area overlapped with the first non-transmissive area NTA1 and a second touch bridge line disposed in a second layer in an area that is not overlapped with the first non-transmissive area NTA1. One first touch bridge line may be connected to one second touch bridge line at one end through a third contact hole CH3, and may be connected to another second touch bridge line at the other end through a fourth contact hole CH4. For example, the first layer may be the same layer as a gate electrode of a driving transistor, and the second layer may be the same layer as a source electrode and a drain electrode of the driving transistor.

In the transparent display panel 110 according to one embodiment of the present disclosure, a plurality of touch lines TL may be disposed in the first non-transmissive area NTA1 that is not a second non-transmissive area NTA2, whereby light transmittance may be prevented from being deteriorated due to the plurality of touch lines TL. The second non-transmissive area NTA2 extended in the second direction (X-axis direction) crosses between adjacent transmissive areas TA as shown in FIG. 3. When a width of the second non-transmissive area NTA2 crossing the transmissive areas TA is increased, a size of the transmissive area TA is necessarily reduced.

When the plurality of touch lines TL are disposed in the second non-transmissive area NTA2, the width of the second non-transmissive area NTA2 is increased to dispose a large number of lines, and the size of the transmissive area TA is reduced. That is, a problem may occur in that light transmittance of the transparent display panel 110 is reduced due to the plurality of touch lines TL.

In the transparent display panel 110 according to one embodiment of the present disclosure, the plurality of touch lines TL are disposed in the first non-transmissive area NTA1, and only one touch bridge line TBL for connecting the plurality of touch sensors TS are provided in the second non-transmissive area NTA2. Therefore, the transparent display panel 110 according to one embodiment of the present disclosure may reduce or minimize the size decrease of the transmissive area TA or decrease in light transmittance due to the plurality of touch lines TL and the touch bridge line TBL.

The touch sensor TS may be provided in the transmissive area TA. The touch sensor TS may be disposed in each of the plurality of transmissive areas TA, and may be changed in capacitance during user contact. A touch driver (not shown) may be connected to the plurality of touch sensors TS through the plurality of touch lines TL to detect a change in capacitance of the plurality of touch sensors TS.

Hereinafter, a connection relation among a plurality of touch sensors TS, a plurality of touch lines TL and a plurality of touch bridge lines TBL will be described in more detail with reference to FIGS. 4 and 5.

Figure 4:
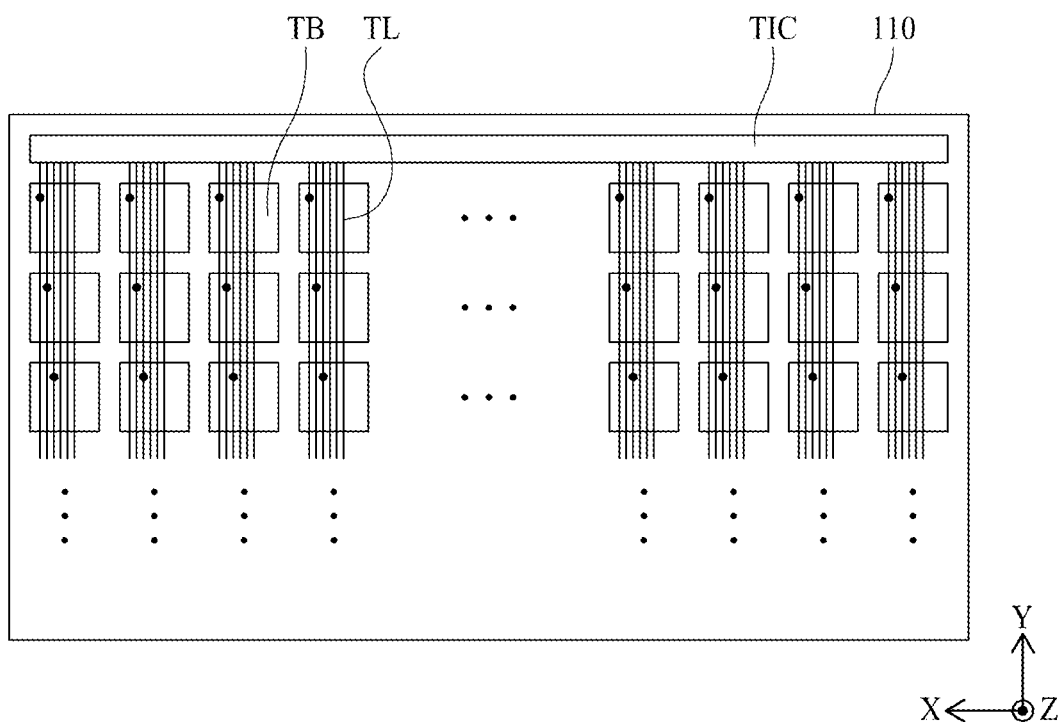
FIG. 4 is a view illustrating a connection relation between a plurality of touch blocks and a plurality of touch lines.
Figure 5:
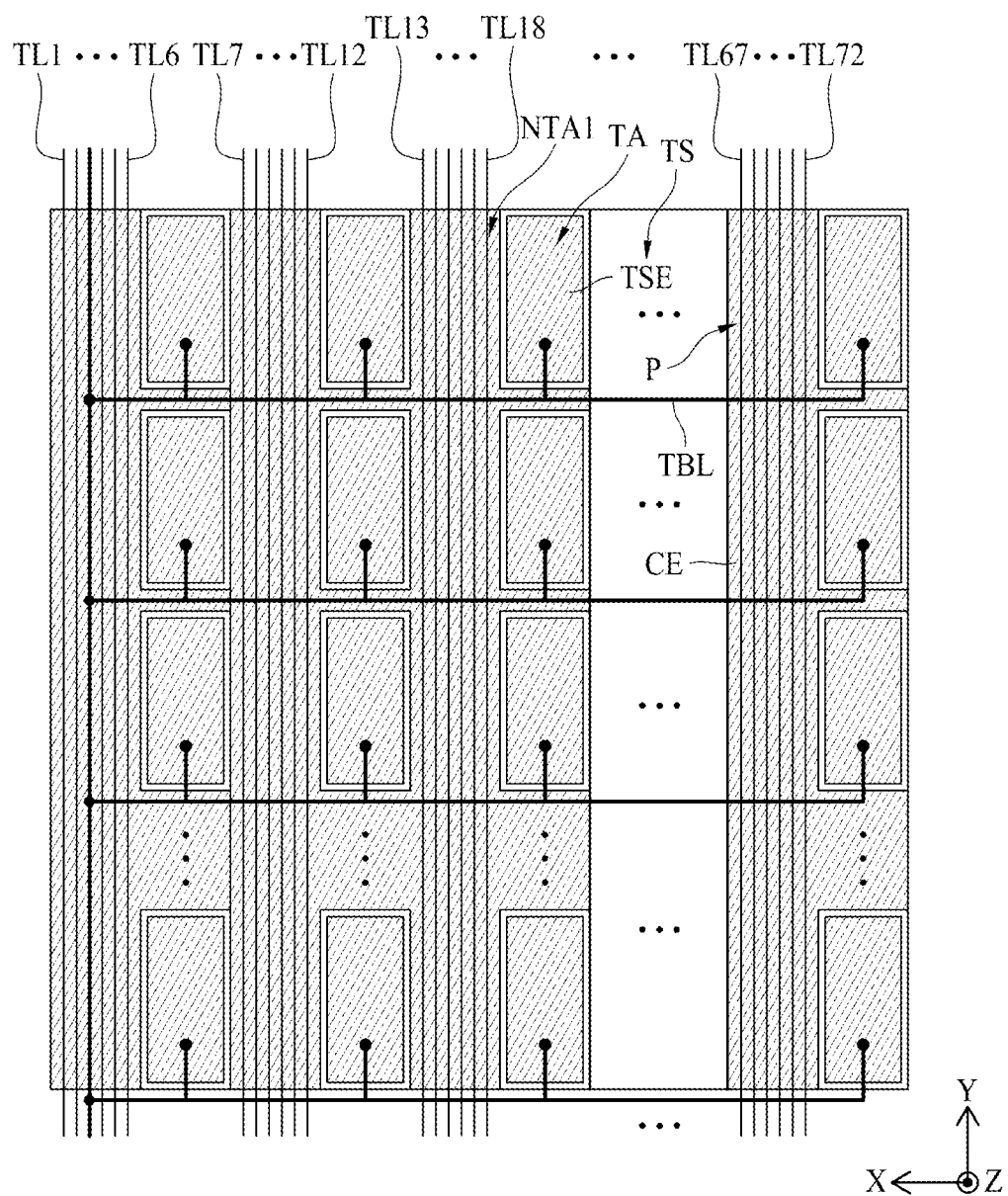
FIG. 5 is a view illustrating a connection relation between a plurality of touch lines and a plurality of touch sensors in one touch block.

FIG. 4 is a view illustrating a connection relation between a plurality of touch blocks and a plurality of touch lines, and FIG. 5 is a view illustrating a connection relation between a plurality of touch lines and a plurality of touch sensors in one touch block.

Referring to FIGS. 4 to 5, the transparent display panel 110 according to one embodiment of the present disclosure may include a plurality of touch blocks TB. Each of the plurality of touch blocks TB may include a plurality of pixels P and a plurality of transmissive areas TA disposed to correspond to the plurality of pixels P one-to-one as a basic unit for determining a user touch position.

As shown in FIG. 5, the transparent display panel 110 according to one embodiment of the present disclosure may include a touch sensor TS in the transmissive area TA. For example, each of the plurality of touch blocks TB may include 12×15 pixels P and 12×15 touch sensors TS. In this case, when image resolution is 1920×1080, touch resolution may be 160×72.

At this time, the touch sensor TS may include a touch sensor electrode TSE. The touch sensor electrode TSE may include the same material in the same layer as the cathode electrode CE of the pixel P. In this case, the touch sensor electrode TSE and the cathode electrode CE may be disposed to be spaced apart from each other.

In the transparent display panel 110 according to one embodiment of the present disclosure, as each of the plurality of touch lines TL is connected to one of the plurality of touch blocks TB, a change in capacitance of the touch sensors TS provided in the connected touch block TB may be sensed. That is, the plurality of touch lines TL provided in the transparent display panel 110 may correspond to the plurality of touch blocks TB one-to-one. Therefore, the number of touch lines TL may be the same as the number of touch blocks TB in the transparent display panel 110. For example, when the number of touch blocks TB is 160×72, the touch line TL may also be 160×72, and may be connected to the touch driver TIC.

As described above, in order to form the touch lines TL as much as the number of touch blocks TB, at least two touch lines TL should be provided in one first non-transmissive area NTA1. For example, when image resolution is 1920×1080 and touch resolution is 160×72, six touch lines TL1, TL2, TL3, TL4, TL5 and TL6 may be provided in one first non-transmissive area NTA1, as shown in FIG. 3, in order to form 160×72 touch lines TL in the transparent display panel 110.

The plurality of touch sensors TS provided in one touch block TB may be connected to one of the plurality of touch lines TL provided in one touch block TB as shown in FIG. 5. For example, twelve first non-transmissive areas NTA1 may be provided in one touch block TB, and six touch lines TL1, TL2, TL3, TL4, TL5 and TL6 may be disposed in each of the twelve first non-transmissive areas NTA1. As a result, one touch block TB may be provided with 72 touch lines TL1, . . . , TL72. In this case, the plurality of touch sensors TS provided in one touch block TB may be connected to one specific touch line TL of the 72 touch lines TL1, . . . , TL72. At this time, the specific touch line TL may be connected to the plurality of touch sensors TS arranged in the second direction (X-axis direction) through the touch bridge lines TBL extended in the second direction (X-axis direction). As a result, the plurality of touch sensors TS provided in one touch block TB may be electrically connected through a specific touch line TL and the touch bridge lines TBL.

Each of the plurality of touch lines TL may correspond to touch blocks TB one-to-one. Therefore, the plurality of touch blocks TB are connected to different touch lines and thus may be electrically separated from each other. Each touch line TL may connect a plurality of touch sensors TS provided in a corresponding touch block TB to a touch driver TIC. In detail, each touch line TL may transmit the changed capacitance provided from the touch sensors TS provided in the touch block TB to the touch driver TIC. The touch driver TIC may sense the changed capacitance, and may determine a touch position of a user. Also, each touch line TL may provide the touch sensing voltage generated from the touch driver TIC to the touch sensors TS provided in the touch block TB.

Hereinafter, light emitting elements of a light emission area EA, the touch sensors TS of the transmissive area TA, and the connection relation between the touch sensors TS and the touch bridge line TBL will be described in more detail with reference to FIGS. 6 to 16.

Figure 6:
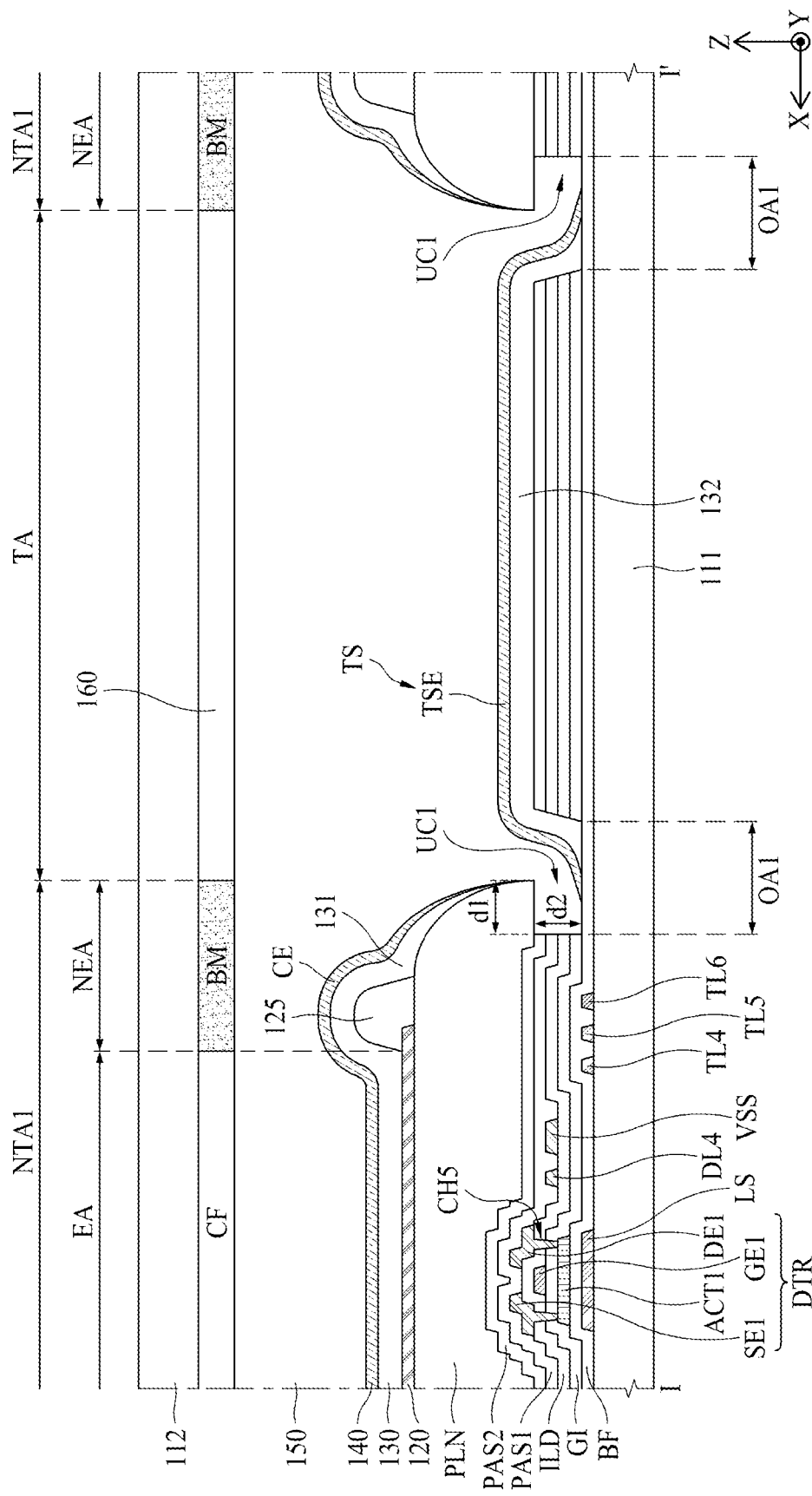
FIG. 6 is a cross-sectional view taken along line I-I' of FIG. 3.
Figure 7:
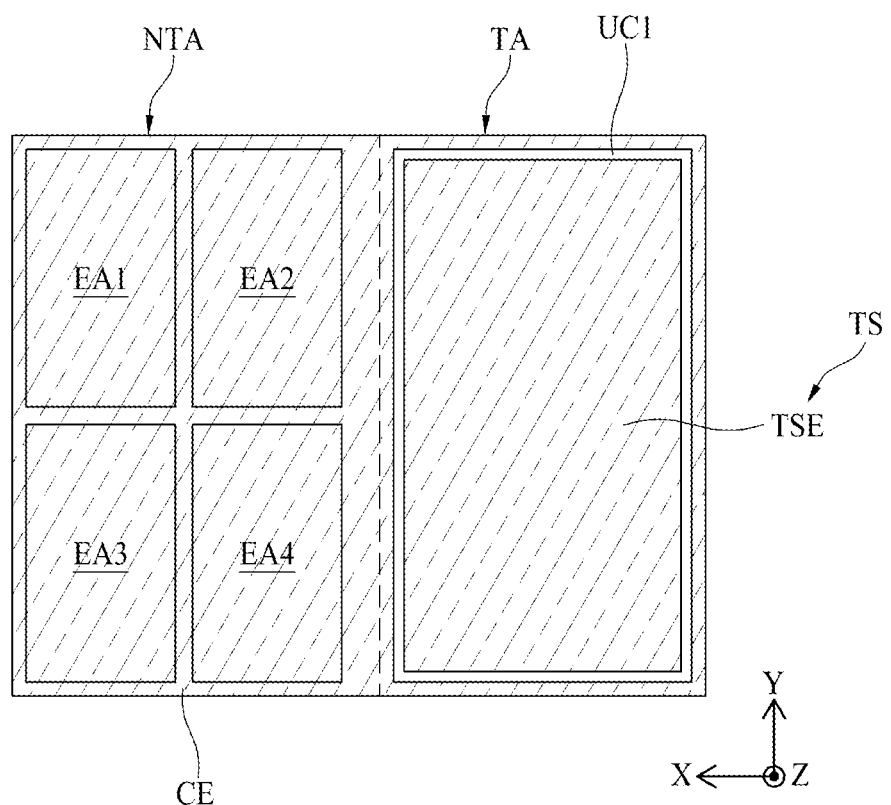
FIG. 7 is a view illustrating an example that a cathode electrode and a touch sensor electrode are disposed.
Figure 8:
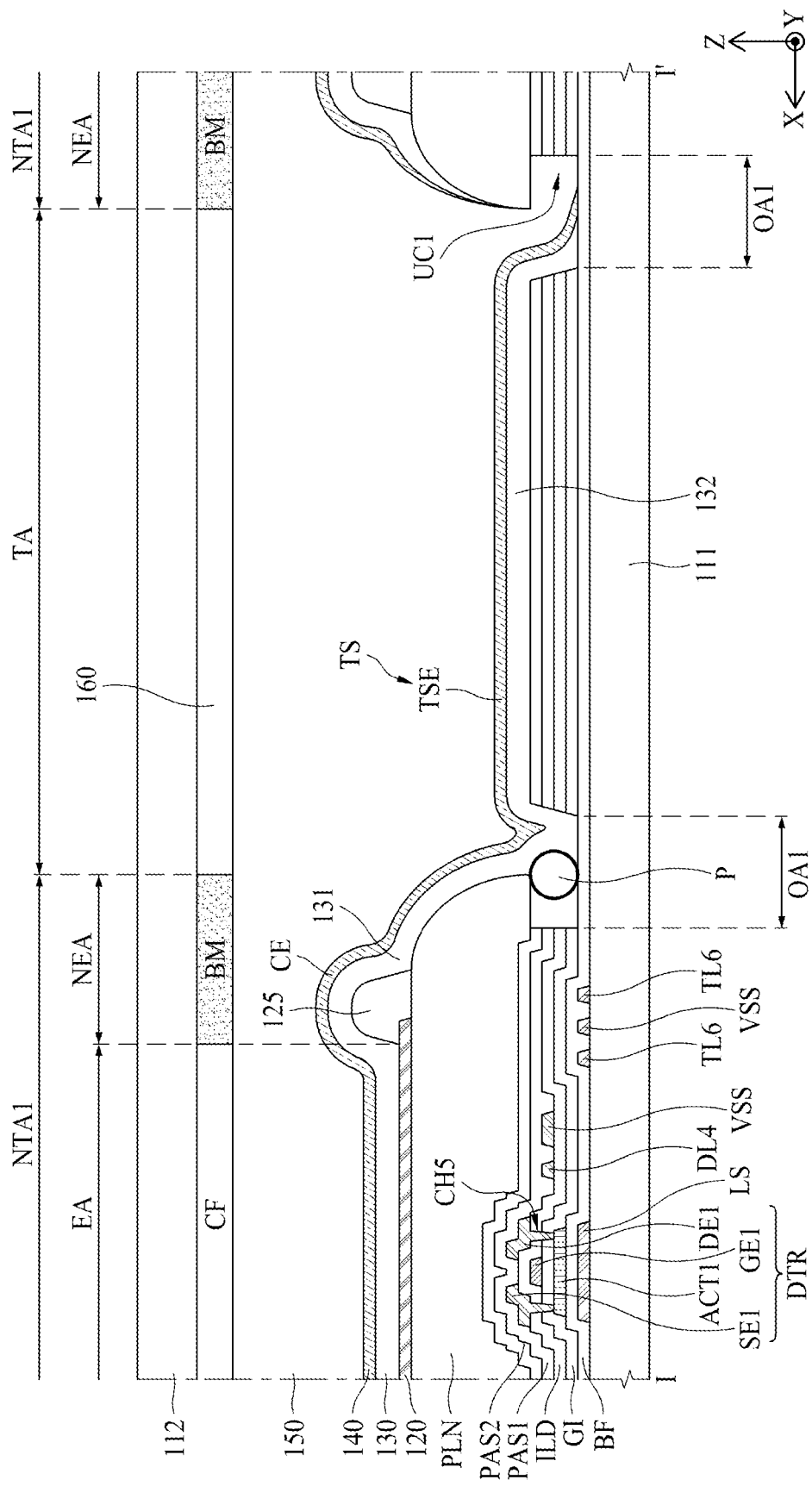
FIG. 8 is a view illustrating an example that a defective touch sensor occurs in a first undercut structure due to particles.

FIG. 6 is a cross-sectional view taken along line I-I' of FIG. 3, FIG. 7 is a view illustrating an example that a cathode electrode and a touch sensor electrode are disposed, and FIG. 8 is a view illustrating an example that a defective touch sensor occurs in a first undercut structure due to particles.

Referring to FIGS. 3 and 6 to 8, the first non-transmissive area NTA1 may include circuit areas CA1, CA2, CA3 and CA4 in which at least one transistor and a capacitor are disposed, and a pixel power line VDDL, a common power line VSSL, a reference line REFL, data lines DL and touch lines TL, which are extended in a first direction (Y-axis direction) and disposed so as not to overlap the circuit areas CA1, CA2, CA3 and CA4. The second non-transmissive area NTA2 may include first and scan lines SCANL1 and SCANL2 and a touch bridge line TBL, which are extended in the second direction (X-axis direction).

The at least one transistor may include a driving transistor DTR, and switching transistors. The switching transistor is switched in accordance with a first scan signal supplied to the first scan line SCANL1 to charge a data voltage supplied from the data line DL in the capacitor.

The driving transistor DTR is switched in accordance with the data voltage charged in the capacitor to generate a data current from a power source supplied from the pixel power line VDDL and supply the data current to a first electrode 120 of the subpixels SP1, SP2, SP3 and SP4. The driving transistor DTR may include an active layer ACT1, a gate electrode GE1, a source electrode SE1, and a drain electrode DE1.

In detail, as shown in FIG. 6, a light shielding layer LS may be provided over a first substrate 111. The light shielding layer LS may serve to shield external light incident on the active layer ACT1 in an area in which the driving transistor DTR is provided. The light shielding layer LS may include a single layer or multi-layer made of any one of molybdenum (Mo), aluminum (Al), chromium (Cr), gold (Au), titanium (Ti), nickel (Ni), neodymium (Nd) and copper (Cu), or their alloy.

The transparent display panel 110 according to one embodiment of the present disclosure may form at least a portion of the pixel power line VDDL, the common power line VSSL, the reference line REFL, the data lines DL and the touch lines TL in the same layer as the light shielding layer LS. For example, the reference line REFL and the touch lines TL may include the same material as that of the light shielding layer LS in the same layer as the light shielding layer LS, but are not limited thereto.

A buffer layer BF may be provided over the light shielding layer LS. The buffer layer BF is to protect the transistors DTR from water permeated through the first substrate 111 vulnerable to water permeation, and may include an inorganic layer, for example, a silicon oxide layer (SiOx), a silicon nitride layer (SiNx) or a multi-layer of the silicon oxide layer and the silicon nitride layer.

An active layer ACT1 of the driving transistor DTR may be provided over the buffer layer BF. The active layer ACT1 of the driving transistor DTR may include a silicon-based semiconductor material or an oxide-based semiconductor material.

A gate insulating layer GI may be provided over the active layer ACT1 of the driving transistor DTR. The gate insulating layer GI may be provided in the non-transmissive area NTA and the transmissive area TA. However, in order to form a first undercut structure UC1 in the transmissive area TA, a first opening area OA1, which exposes the buffer layer BF without being provided in at least a portion of the transmissive area TA, may be provided. The gate insulating layer GI may include an inorganic layer, for example, a silicon oxide layer (SiOx), a silicon nitride layer (SiNx) or a multi-layer of the silicon oxide layer and the silicon nitride layer.

A gate electrode GE1 of the driving transistor DTR may be provided over the gate insulating layer GI. The gate electrode GE1 of the driving transistor DTR may include a single layer or multi-layer made of one of molybdenum (Mo), aluminum (Al), chromium (Cr), gold (Au), titanium (Ti), nickel (Ni), neodymium (Nd) and copper (Cu), or their alloy.

An interlayer dielectric layer ILD may be provided over the gate electrode GE1 of the driving transistor DTR. The interlayer dielectric layer ILD may be provided in the non-transmissive area NTA and the transmissive area TA. However, the interlayer dielectric layer ILD may be provided with a first opening area OA1, which exposes the buffer layer BF without being provided in at least a portion of the transmissive area TA, to form a first undercut structure UC1 in the transmissive area TA. The interlayer dielectric layer ILD may include an inorganic layer, for example, a silicon oxide layer (SiOx), a silicon nitride layer (SiNx) or a multi-layer of the silicon oxide layer and the silicon nitride layer.

The source electrode SE1 and the drain electrode DE1 of the driving transistor DTR may be provided over the interlayer dielectric layer ILD. The source electrode SE1 and the drain electrode DE1 of the driving transistor DTR may be connected to the active layer ACT1 of the driving transistor DTR through a fifth contact hole CH5 passing through the gate insulating layer GI and the interlayer dielectric layer ILD. The source electrode SE1 and the drain electrode DE1 of the driving transistor DTR may include a single layer or multi-layer made of one of molybdenum (Mo), aluminum (Al), chromium (Cr), gold (Au), titanium (Ti), nickel (Ni), neodymium (Nd) and copper (Cu), or their alloy.

In the transparent display panel 110 according to one embodiment of the present disclosure, at least a portion of the pixel power line VDDL, the common power line VSSL, the reference line REFL, the data lines DL and the touch lines TL may be provided in the same layer as the source electrode SE1 and the drain electrode DE1 of the driving transistor DTR. For example, a portion of the pixel power line VDDL, the common power line VSSL and the data lines DL may include the same material as that of the source electrode SE1 and the drain electrode DE1 of the driving transistor DTR in the same layer as the source electrode SE1 and the drain electrode DE1, but are not limited thereto.

A first passivation layer PAS1 for insulating the driving transistor DTR may be provided over the source electrode SE1 and the drain electrode DE1 of the driving transistor DTR, and a second passivation layer PAS2 may be provided over the first passivation layer PAS1.

The first and second passivation layers PAS1 and PAS2 may be provided in the non-transmissive area NTA and the transmissive area TA. However, the first and second passivation layers PAS1 and PAS2 may be provided with a first opening area OA1, which exposes the buffer layer BF without being provided in at least a portion of the transmissive area TA, to form the first undercut structure UC1 in the transmissive area TA. The first opening area OA1 of the first and second passivation layers PAS1 and PAS2 may at least partially overlap the first opening area OA1 of the interlayer dielectric layer ILD and the first opening area OA1 of the gate insulating layer GI. The first and second passivation layers PAS1 and PAS2 may include an inorganic layer, for example, a silicon oxide layer (SiOx), a silicon nitride layer (SiNx) or a multi-layer of the silicon oxide layer and the silicon nitride layer.

A planarization layer PLN may be provided over the second passivation layer PAS2 to planarize a step difference due to the driving transistor DTR and the plurality of signal lines. The planarization layer PLN may be provided in the non-transmissive area NTA, and may not be provided in at least a portion of the transmissive area TA to form the first undercut structure UC1 in the transmissive area TA. The planarization layer PLN may include an organic layer such as an acrylic resin, an epoxy resin, a phenolic resin, a polyamide resin and a polyimide resin.

In the transparent display panel 110 according to one embodiment of the present disclosure, the first undercut structure UC1 may be formed using the planarization layer PLN and the plurality of inorganic insulating layers, for example, the first and second passivation layers PAS1 and PAS2, the interlayer dielectric layer ILD and the gate insulating layer GI. In detail, the first undercut structure UC1 may be formed in such a manner that the planarization layer PLN is more protruded than the plurality of inorganic insulating layers, for example, the first and second passivation layers PAS1 and PAS2, the interlayer dielectric layer ILD and the gate insulating layer GI in a direction of the transmissive area TA. Therefore, the first undercut structure UC1 may expose at least a portion of a lower surface of the planarization layer PLN, and the plurality of inorganic insulating layers may not be provided below the exposed lower surface so that a gap space with the buffer layer BF may be formed.

The first undercut structure UC1 may be formed through a wet etching process. The wet etching process for forming the first undercut structure UC1 may be isotropic etching. Therefore, in the first undercut structure UC1, a first spaced distance d1 from an end of the planarization layer PLN to an end of the plurality of inorganic insulating layers may be the same as a second spaced distance d2 from a lower surface of the planarization layer PLN to an upper surface of the buffer layer BF. At this time, the first spaced distance d1 of the first undercut structure UC1 should have a minimum distance value, for example, 2 um or more in order to ensure separation of the cathode electrode CE and the touch sensor electrode TSE. Therefore, since the second spaced distance d2 of the first undercut structure UC1 should be greater than or equal to 2 um, a sum of thicknesses of the first and second passivation layers PAS1 and PAS2, the interlayer dielectric layer ILD and the gate insulating layer GI may be greater than or equal to 2 um.

The first undercut structure UC1 may be provided in the transmissive area TA, and may have a planar closed shape. For example, the first undercut structure UC1 may be provided along the along the edge of the transmissive area TA, as shown in FIG. 7. The first undercut structure UC1 may be provided to surround the touch sensor TS.

In the transparent display panel 110 according to one embodiment of the present disclosure, the first undercut structure UC1 may be formed using the planarization layer PLN and the plurality of inorganic insulating layers, whereby light transmittance may be prevented from being reduced due to the first undercut structure UC1.

A light emitting element, which includes a first electrode 120, an organic light emitting layer 130 and a second electrode 140, and a bank 125 may be provided over the planarization layer PLN.

The first electrode 120 may be provided over the planarization layer PLN for each of the subpixels SP1, SP2, SP3 and SP4. The first electrode 120 is not provided in the transmissive area TA. The first electrode 120 may be connected to the driving transistor DTR. In detail, the first electrode 120 may be connected to one of the source electrode SE1 and the drain electrode DE1 of the driving transistor DTR through a contact hole (not shown) that passes through the planarization layer PLN and the first and second passivation layers PAS1 and PAS2.

The first electrode 120 may include a metal material having high reflectance, such as a stacked structure (Ti/Al/Ti) of aluminum and titanium, a stacked structure (ITO/Al/ITO) of aluminum and ITO, an Ag alloy, a stacked structure (ITO/Ag alloy/ITO) of Ag alloy and ITO, a MoTi alloy, and a stacked structure (ITO/MoTi alloy/ITO) of MoTi alloy and ITO. The Ag alloy may be an alloy of silver (Ag), palladium (Pd), copper (Cu), etc. The MoTi alloy may be an alloy of molybdenum (Mo) and titanium (Ti). The first electrode 120 may be an anode electrode.

The bank 125 may be provided over the planarization layer PLN. The bank 125 may be provided to at least partially cover an edge of the first electrode 120 and expose a portion of the first electrode 120. Therefore, the bank 125 may prevent a problem in which light emitting efficiency is deteriorated due to concentration of a current on an end of the first electrode 120.

The bank 125 may define light emission areas EA1, EA2, EA3 and EA4 of the subpixels SP1, SP2, SP3 and SP4. The light emission areas EA1, EA2, EA3 and EA4 of each of the subpixels SP1, SP2, SP3 and SP4 represent an area in which the first electrode 120, the organic light emitting layer 130 and the cathode electrode CE are sequentially stacked and holes from the first electrode 120 and electrons from the cathode electrode CE are combined with each other in the organic light emitting layer 130 to emit light. In this case, the area in which the bank 125 is provided may become the non-light emission area NEA because light is not emitted therefrom, and the area in which the bank 125 is not provided and the first electrode is exposed may become the light emission area EA.

The bank 125 may include an organic layer such as an acrylic resin, an epoxy resin, a phenolic resin, a polyamide resin, and a polyimide resin.

The organic light emitting layer 130 may be disposed over the first electrode 120. The organic light emitting layer 130 may include a hole transporting layer, a light emitting layer and an electron transporting layer. In this case, when a voltage is applied to the first electrode 120 and the cathode electrode CE, holes and electrons move to the light emitting layer through the hole transporting layer and the electron transporting layer, respectively and are combined with each other in the light emitting layer to emit light.

In one embodiment, the organic light emitting layer 130 may be a common layer commonly provided in the subpixels SP1, SP2, SP3 and SP4. In this case, the light emitting layer may be a white light emitting layer for emitting white light.

In another embodiment, the light emitting layer of the organic light emitting layer 130 may be provided for each of the subpixels SP1, SP2, SP3 and SP4. For example, a green light emitting layer for emitting green light may be provided in the first subpixel SP1, a red light emitting layer for emitting red light may be provided in the second subpixel SP2, a blue light emitting layer for emitting blue light may be provided in the third subpixel SP3, and a white light emitting layer for emitting white light may be provided in the fourth subpixel SP4. In this case, the light emitting layer of the organic light emitting layer 130 is not provided in the transmissive area TA.

An organic light emitting layer 130 may be separated from the non-transmissive area NTA and the transmissive area TA by the first undercut structure UC1. In detail, the organic light emitting layer 130 may be separated from an organic light emitting layer 131 provided in the non-transmissive area NTA and an organic light emitting layer 132 provided in the transmissive area TA by the first undercut structure UC1. That is, the organic light emitting layer 131 provided in the non-transmissive area NTA and the organic light emitting layer 132 provided in the transmissive area TA may be spaced apart from each other by the first undercut structure UC1.

A second electrode 140 may be disposed over the organic light emitting layer 130 and a bank 125. When the second electrode 140 is deposited on an entire surface, the second electrode 140 may be separated without being continuous between the non-transmissive area NTA and the transmissive area TA by the first undercut structure UC1. In detail, the second electrode 140 may be separated into a second electrode CE provided in the non-transmissive area NTA and a second electrode TSE provided in the transmissive area TA by the first undercut structure UC1.

In this case, the second electrode CE provided in the non-transmissive area NTA may be a cathode electrode CE, and is an element constituting a light emitting element. The cathode electrode CE may be connected to a cathode contact portion CCT to receive a power source from the common power line VSSL. The cathode electrode CE may be a common layer that is commonly provided in the subpixels SP1, SP2, SP3 and SP4 to apply the same voltage.

Also, the second electrode TSE provided in the transmissive area TA is a touch sensor electrode TSE, and may be an element constituting the touch sensor TS. The touch sensor electrode TSE may be connected to a second touch contact electrode TCT2 to provide a change in capacitance to the touch line TL.

The second electrode 140, which includes the cathode electrode CE and the touch sensor electrode TSE, may include a transparent conductive material (TCO) such as ITO and IZO, which may transmit light, or a semi-transmissive conductive material such as magnesium (Mg), silver (Ag) or an alloy of magnesium (Mg) and silver (Ag). When the second electrode 140 includes a semi-transmissive conductive material, light emitting efficiency may be increased by a micro cavity.

An encapsulation layer 150 may be provided over the light emitting elements and the touch sensors TS. The encapsulation layer 150 may be provided over the cathode electrode CE and the touch sensor electrode TSE to at least partially cover the cathode electrode CE and the touch sensor electrode TSE.

The encapsulation layer 150 serves to prevent oxygen or water from being permeated into the organic light emitting layer 130, the cathode electrode CE and the touch sensor electrode TSE. Accordingly, in some embodiments, the encapsulation layer 150 may include at least one inorganic layer and at least one organic layer.

A color filter CF may be provided over the encapsulation layer 150. The color filter CF may be provided over one surface of the second substrate 112 that faces the first substrate 111. In this case, the first substrate 111 provided with the encapsulation layer 150 and the second substrate 112 provided with the color filter CF may be bonded to each other by an adhesive layer 160. At this time, the adhesive layer 160 may be an optically clear resin (OCR) layer or an optically clear adhesive (OCA) film.

The color filter CF may be provided to be patterned for each of the subpixels SP1, SP2, SP3 and SP4. A black matrix BM may be provided between color filters CF. The black matrix BM may be disposed between the subpixels SP1, SP2, SP3 and SP4 to prevent a color mixture from occurring between adjacent subpixels SP1, SP2, SP3 and SP4. In addition, the black matrix BM may prevent light incident from the outside from being reflected by the plurality of lines, for example, the scan lines SCANL, the pixel power line VDDL, the common power line VSSL, the reference line REFL, data lines DL, etc., provided between the subpixels SP1, SP2, SP3 and SP4.

In the transparent display panel 110 according to one embodiment of the present disclosure, the touch sensor electrode TSE of the touch sensor TS and the cathode electrode CE of the light emitting element may be provided in the same layer using the first undercut structure UC1. In the transparent display panel 110 according to one embodiment of the present disclosure, a touch process is simplified, and a separate mask for the touch sensor electrode TSE is not required.

Also, in the transparent display panel 110 according to one embodiment of the present disclosure, the first undercut structure UC1 may be formed using the planarization layer PLN and the plurality of inorganic insulating layers, whereby the first undercut structure UC1 may be formed without loss of light transmittance.

Also, in the transparent display panel 110 according to one embodiment of the present disclosure, the touch lines TL may be disposed below the light emitting element, whereby light emitting efficiency of the pixel P may be prevented from being deteriorated due to the touch lines TL.

Also, in the transparent display panel 110 according to one embodiment of the present disclosure, the touch lines TL may be disposed so as not to overlap the circuit areas CA1, CA2, CA3 and CA4, whereby influence caused by the circuit element may be reduced or minimized and at the same time uniformity of parasitic capacitance may be improved.

Also, in the transparent display panel 110 according to one embodiment of the present disclosure, the plurality of touch lines TL may be disposed in the first non-transmissive area NTA1, and only one touch bridge line TBL for connecting the plurality of touch sensors TS may be provided in the second non-transmissive area NTA2, whereby a decrease in a size of the transmissive area TA or a decrease in light transmittance due to the plurality of touch lines TL and the touch bridge line TBL may be reduced or minimized.

As described above, in the transparent display panel 110 according to one embodiment of the present disclosure, the touch sensor electrode TSE of the touch sensor TS and the cathode electrode CE of the light emitting element may be separated from each other by the first undercut structure UC1. However, in the manufacturing process, particles PRT may occur in the first undercut structure UC1 as shown in FIG. 8. In this case, the touch sensor electrode TSE of the touch sensor TS and the cathode electrode CE of the light emitting element may be electrically connected to each other without being separated from each other.

Since all of the touch sensors TS included in one touch block TB are electrically connected to one another, all the touch sensors TS included in the corresponding touch block TB are not normally operated even though a defect occurs only in one of the touch sensors TS. Therefore, as shown in FIG. 8, when the touch sensor electrode TSE of the touch sensor TS and the cathode electrode CE of the light emitting element are connected to each other to generate the defective touch sensor TS, a touch of a user is not sensed in the entire touch block TB in which the defective touch sensor TS is included.

The transparent display panel 110 according to one embodiment of the present disclosure may include an element that may detect the defective touch sensor TS when the defective touch sensor TS is generated. In the transparent display panel 110 according to one embodiment of the present disclosure, the detected defective touch sensor TS and the touch bridge line TBL may be electrically separated from each other through a repair process. In detail, the transparent display panel 110 according to one embodiment of the present disclosure adds a first touch connection portion TC1 connecting the touch sensor TS with the reference line REFL and a second touch connection portion TC2 connecting the touch sensor TS with the touch bridge line TBL, and may detect the defective touch sensor TS by using the first and second touch connection portions. Also, in the transparent display panel 110 according to one embodiment of the present disclosure, when the defective touch sensor TS is detected, the second touch connection portion TC2 for connecting the defective touch sensor TS with the touch bridge line TBL may be subjected to laser cutting, whereby the defective touch sensor TS and the touch bridge line TBL may be electrically separated from each other. As a result, the other touch sensors TS of the corresponding touch block TB may be normally operated.

Hereinafter, the touch connection portion TC1 and the second touch connection portion TC2, and laser cutting of the second touch connection portion TC2 will be described in detail with reference to FIGS. 9 to 16.

Figure 9:
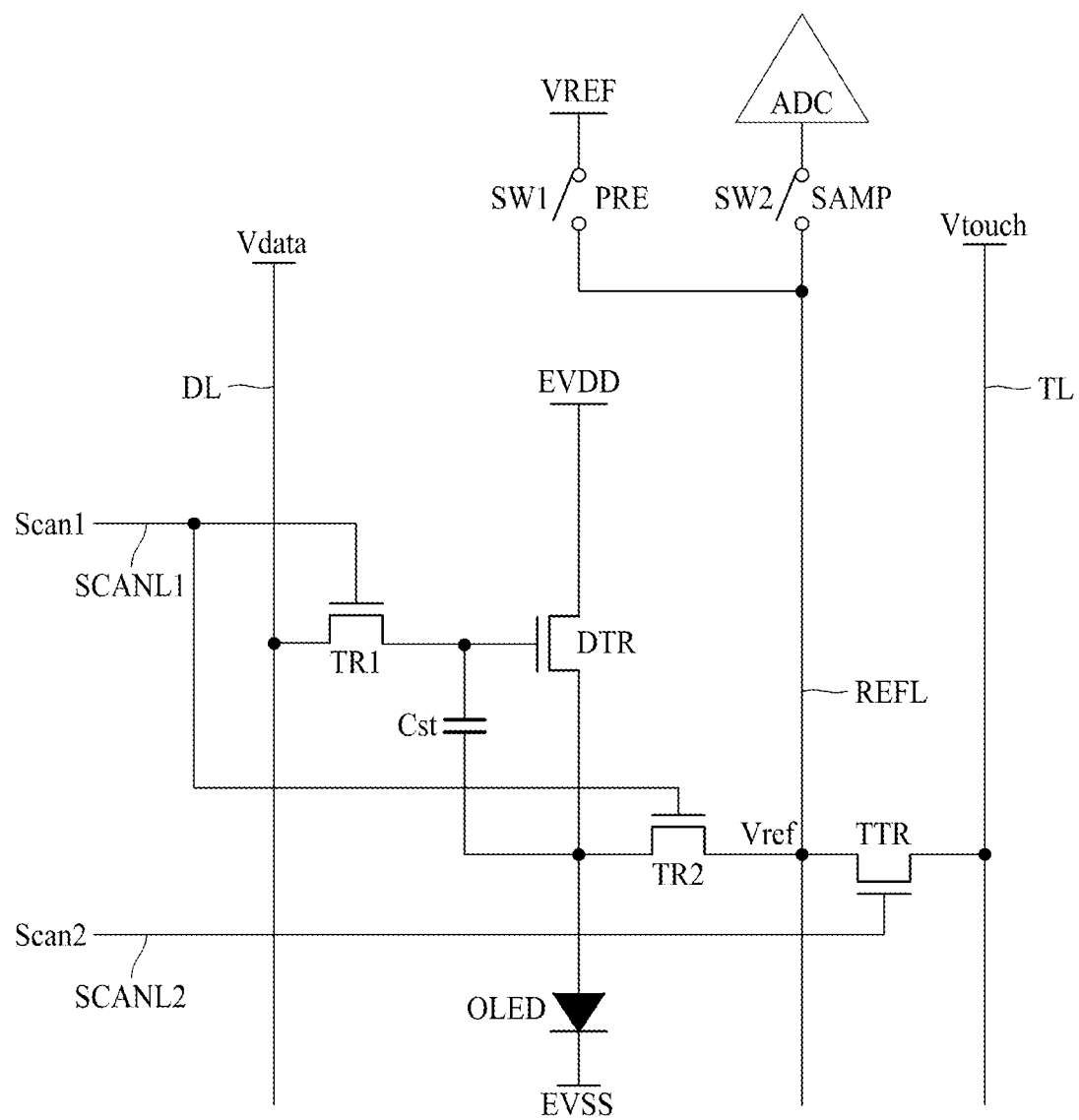
FIG. 9 is a circuit view illustrating an example of a pixel circuit.
Figure 10:
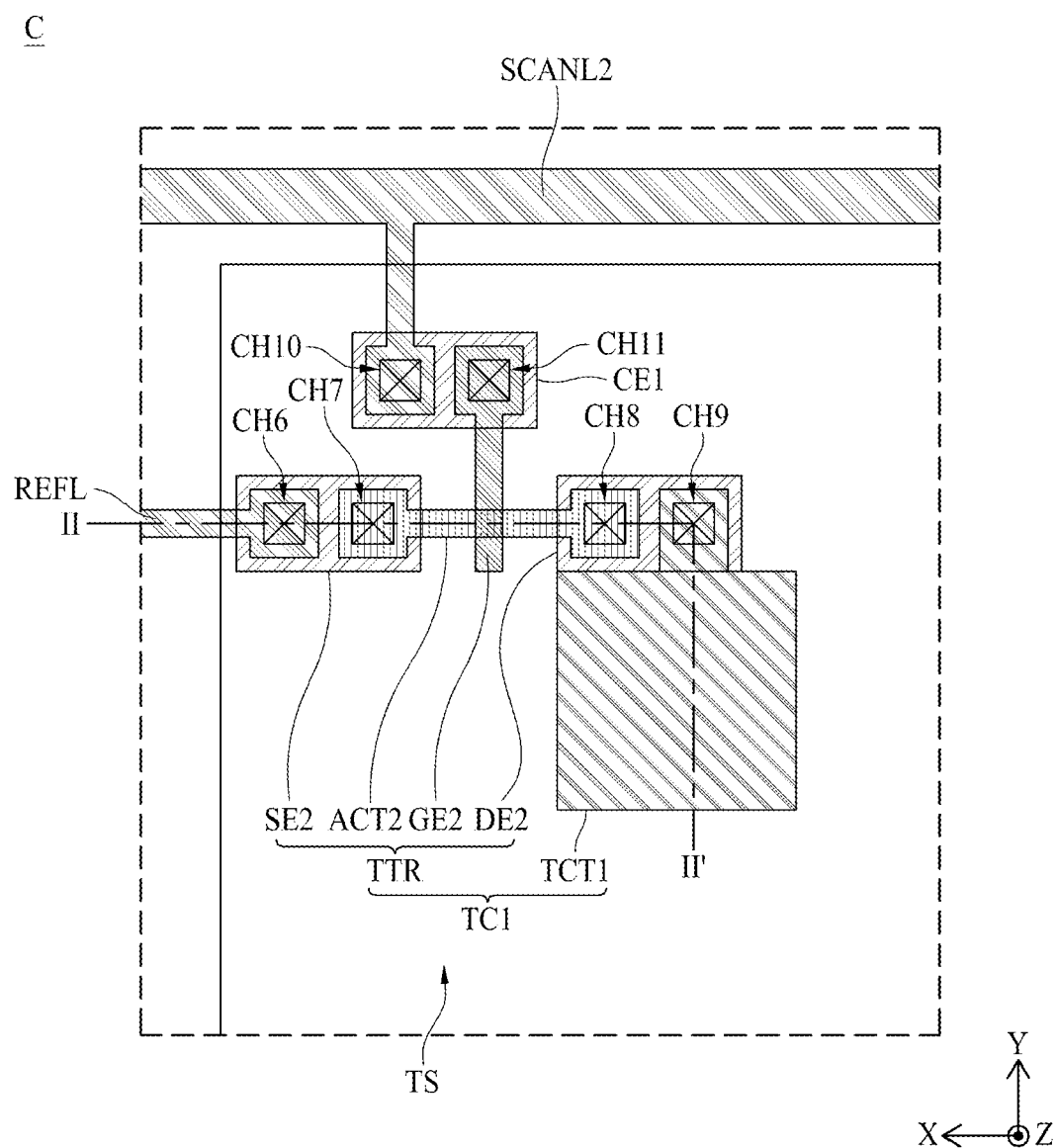
FIG. 10 is an enlarged view illustrating an area C of FIG. 3.
Figure 11:
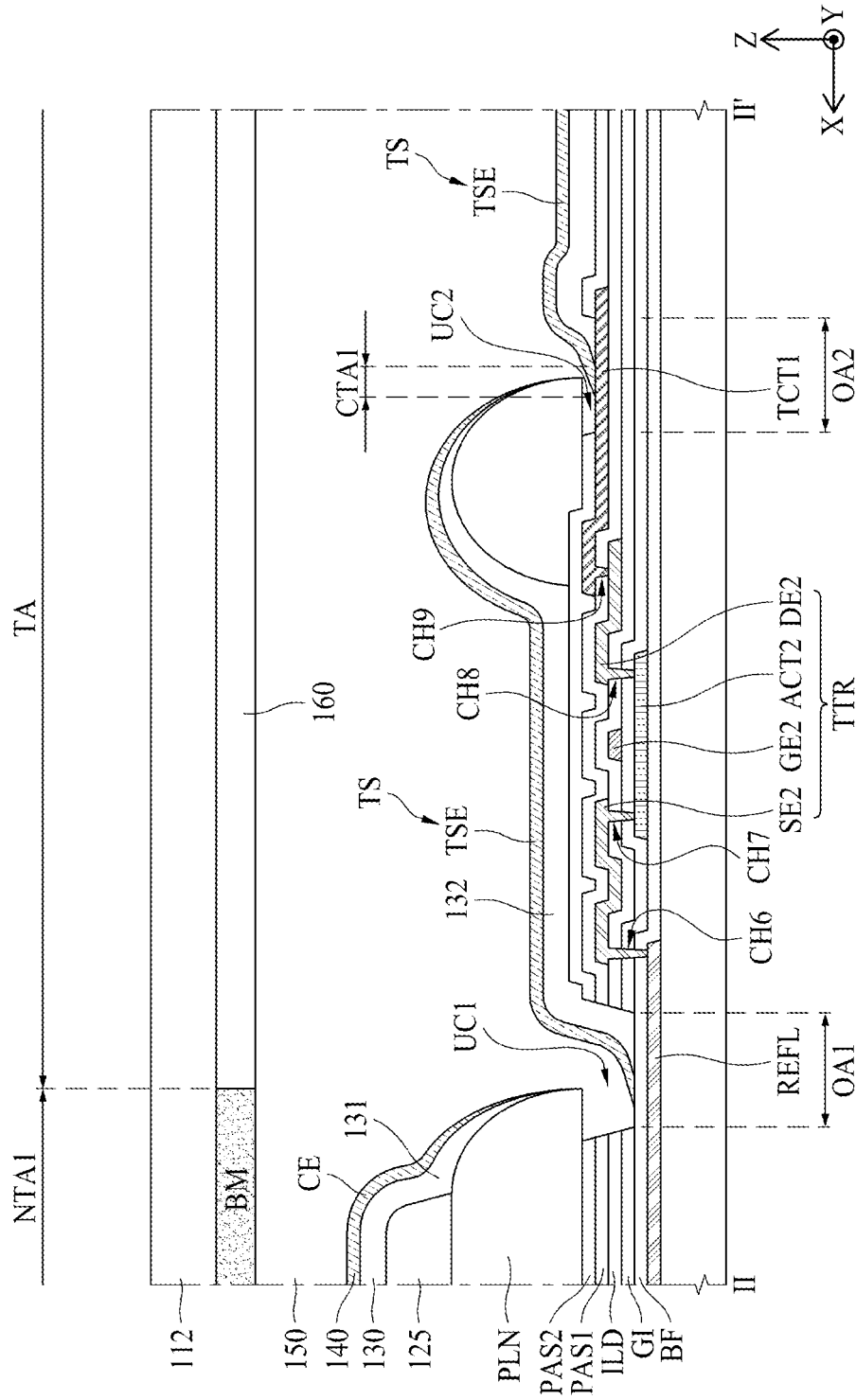
FIG. 11 is a cross-sectional view taken along line II-II' of FIG. 10.
Figure 12:
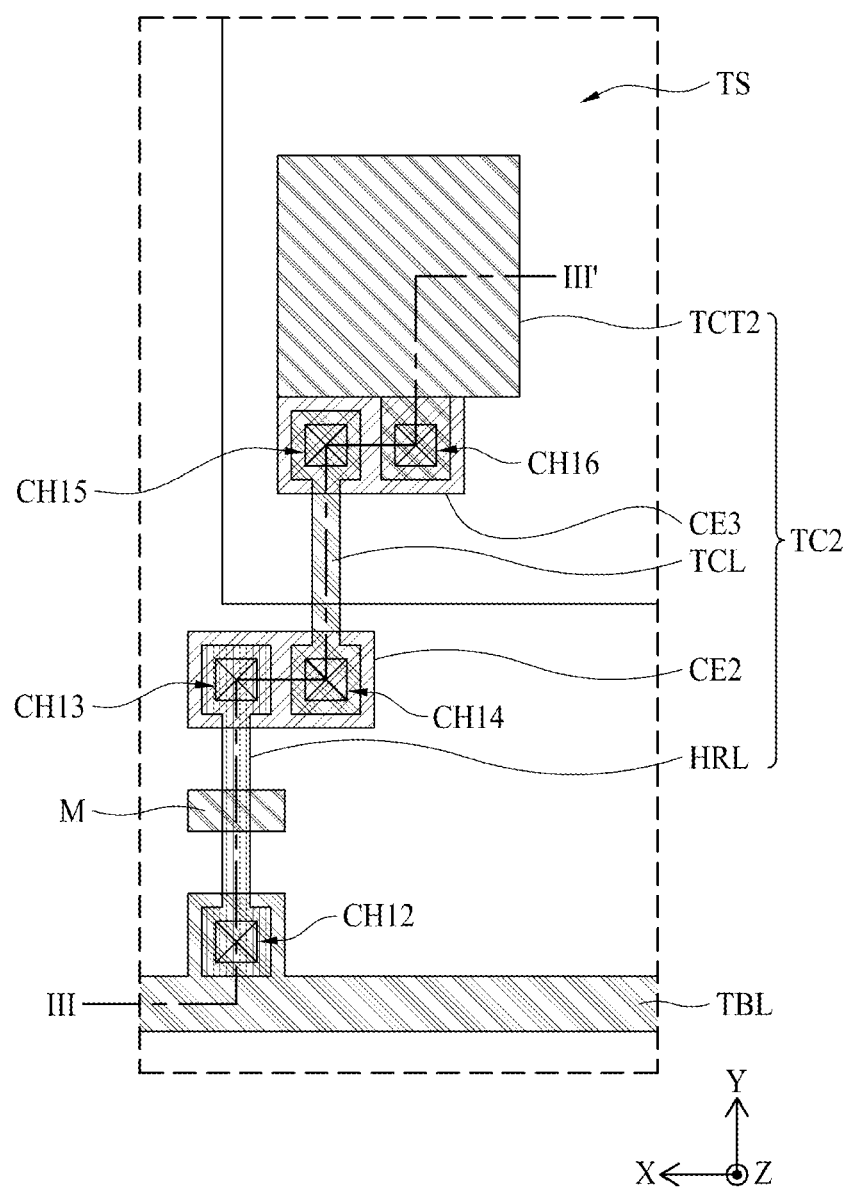
FIG. 12 is an enlarged view illustrating an area D of FIG. 3.
Figure 13:
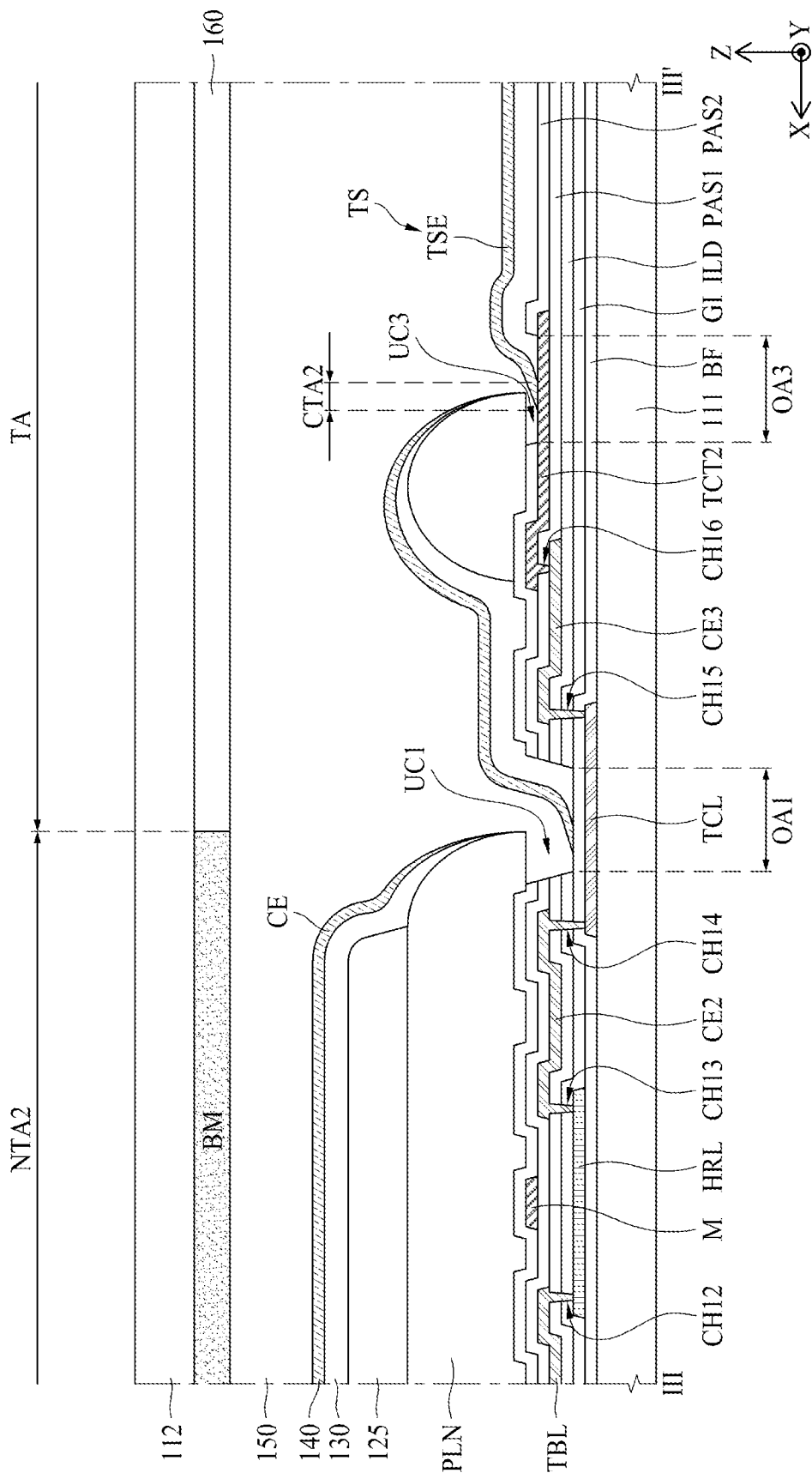
FIG. 13 is a cross-sectional view taken along line III-III' of FIG. 12.
Figure 14:
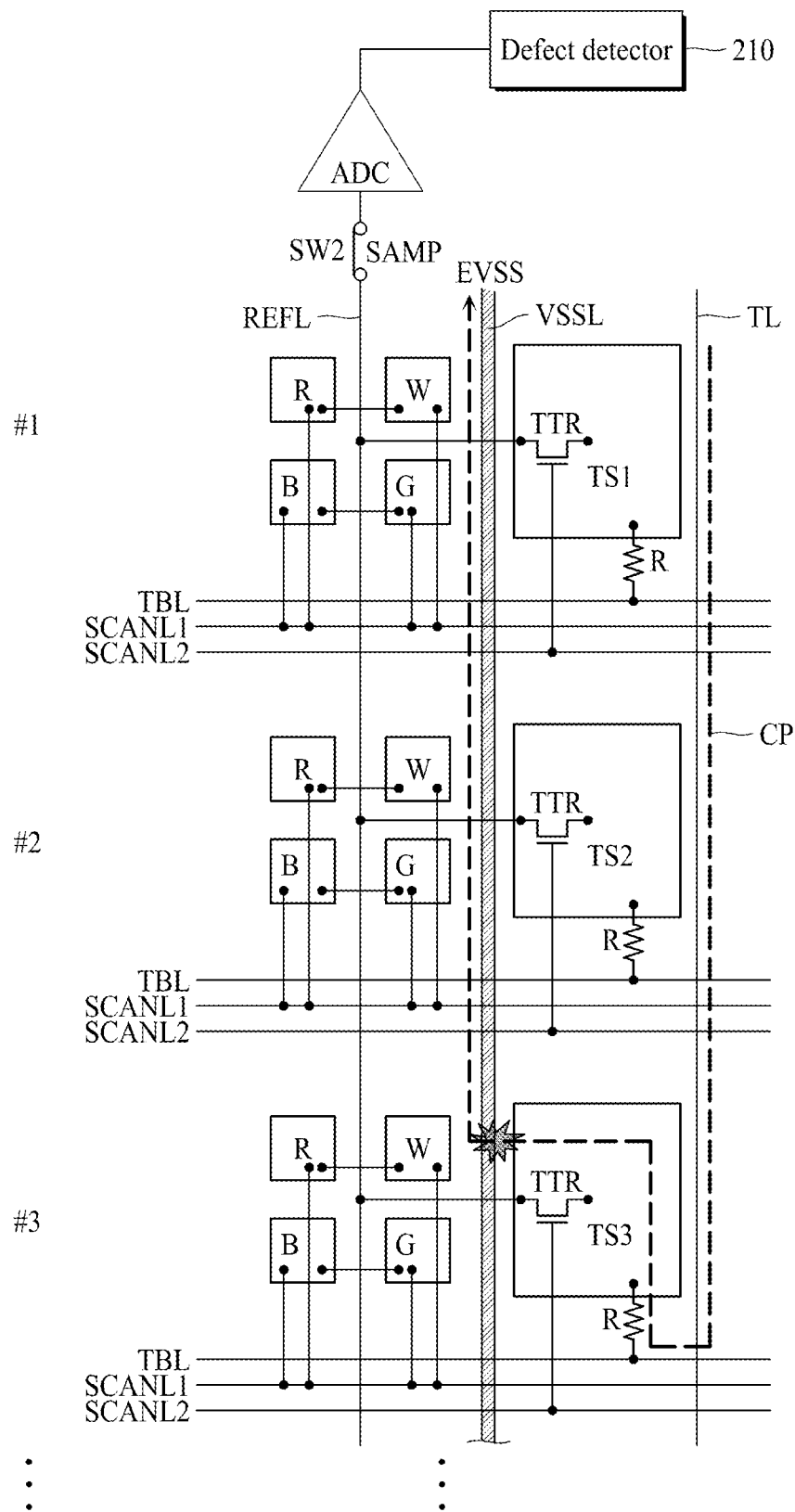
FIG. 14 is a view illustrating a current path in a defective touch sensor.
Figure 15:
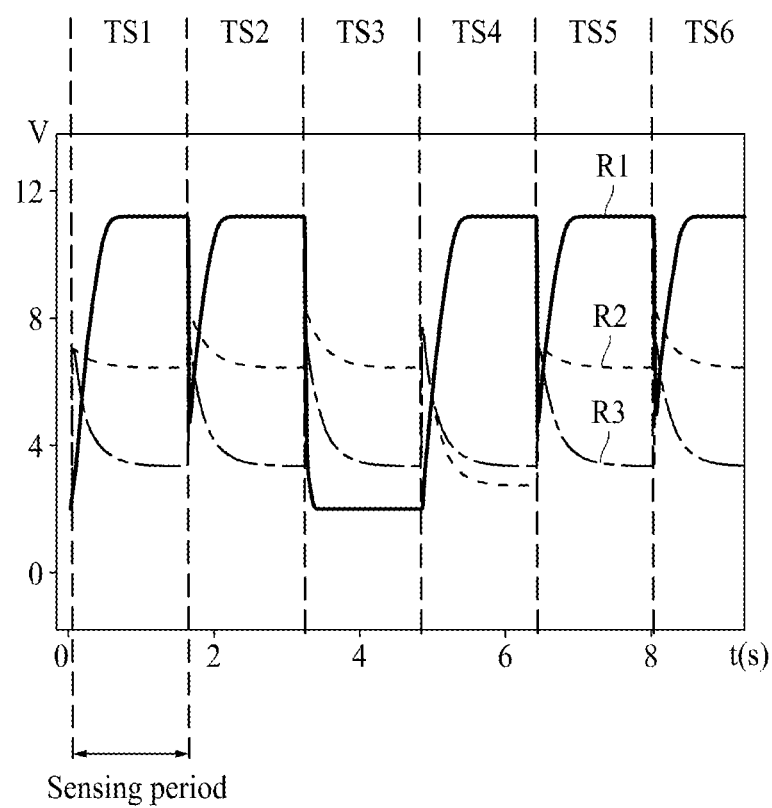
FIG. 15 is a view illustrating a voltage difference between a normal touch sensor and a defective touch sensor.
Figure 16:
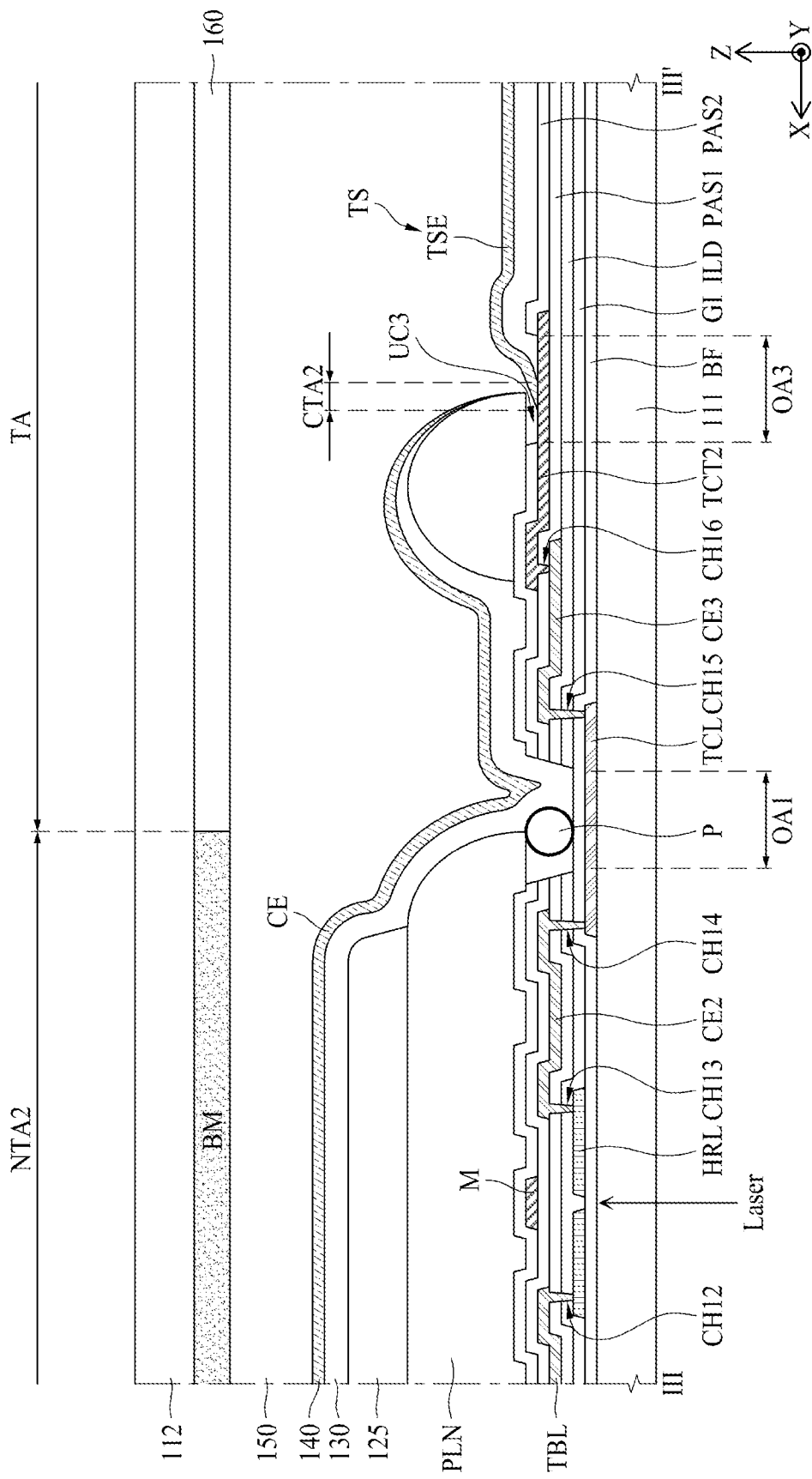
FIG. 16 is a view illustrating an example that a high resistance line is cut by a laser when a defective touch sensor is detected.

FIG. 9 is a circuit view illustrating an example of a pixel circuit, FIG. 10 is an enlarged view illustrating an area C of FIG. 3, FIG. 11 is a cross-sectional view taken along line II-II' of FIG. 10, FIG. 12 is an enlarged view illustrating an area D of FIG. 3, FIG. 13 is a cross-sectional view taken along line III-III' of FIG. 12, FIG. 14 is a view illustrating a current path in a defective touch sensor, FIG. 15 is a view illustrating a voltage difference between a normal touch sensor and a defective touch sensor, and FIG. 16 is a view illustrating an example that a high resistance line is cut by a laser when a defective touch sensor is detected.

As shown in FIG. 9, the transparent display panel 110 according to one embodiment of the present disclosure may include a circuit element that includes first and second switching transistors TR1 and TR2, a driving transistor DTR, a capacitor Cst, a light emitting element OLED and a touch transistor TTR. At this time, the first and second switching transistors TR1 and TR2, the driving transistor DTR, the capacitor Cst and the light emitting element OLED may be provided for each of the subpixels SP1, SP2, SP3 and SP4.

The first switching transistor TR1 charges the data voltage Vdata supplied from the data line DL in the capacitor Cst. In detail, a gate electrode of the first switching transistor TR1 may be connected to the first scan line SCANL1 and its first electrode may be connected to the data line DL. In addition, a second electrode of the first switching transistor TR1 may be connected to one end of the capacitor Cst and the gate electrode GE1 of the driving transistor DTR. The first switching transistor TR1 may be turned on in response to the first scan signal Scan1 applied through the first scan line SCANL1. When the first switching transistor TR1 is turned on, the data voltage Vdata applied through the data line DL may be transferred to one end of the capacitor Cst.

A gate electrode of the second switching transistor TR2 may be connected to the first scan line SCANL1, and its first electrode may be connected to the reference line REFL. In addition, a second electrode of the second switching transistor TR2 may be connected to the source electrode of the driving transistor DTR and the other end of the capacitor Cst.

The reference line REFL may be connected to a reference voltage source VREF or an analog-to-digital (AD) converter ADC in accordance with a control signal. A first switch SW1 may connect or disconnect the reference voltage source VREF to or from the reference line REFL in accordance with an initialization control signal PRE. When the first switch SW1 is turned on in accordance with the initialization control signal PRE of a turn-on level, the reference line REFL may be connected to the reference voltage source VREF and thus initialized to a reference voltage Vref.

The second switching transistor TR2 may be turned on in response to the first scan signal Scan1 applied through the first scan line SCANL1. When the second switching transistor TR2 is turned on, the reference voltage Vref applied through the reference line REFL may be transferred to the other end of the capacitor Cst. Also, the reference voltage Vref may be applied to the source electrode of the driving transistor DTR. Also, when the first switch SW1 is turned off in accordance with the initialization control signal PRE of a turn-off level, the reference line REFL may be separated from the reference voltage source VREF.

The driving transistor DTR generates a data current from a first power source EVDD supplied from the pixel power line VDDL and supplies the data current to the first electrode 120 of the subpixels SP1, SP2, SP3 and SP4. In detail, the gate electrode of the driving transistor DTR may be connected to one end of the capacitor Cst, and its drain electrode may be connected to the pixel power line VDDL. Further, the source electrode of the driving transistor DTR may be connected to an anode electrode of the light emitting element OLED.

The driving transistor DTR may be turned on in accordance with the data voltage charged in the capacitor Cst. When the driving transistor DTR is turned on, the first power source EVDD applied through the pixel power line VDDL may be transferred to the anode electrode of the light emitting element OLED.

The anode electrode of the light emitting element OLED may be connected to the source electrode of the driving transistor DTR, and its cathode electrode may be connected to the common power line VSSL. The light emitting element OLED may emit light in response to the driving current generated by the driving transistor DTR.

The touch transistor TTR may be connected to the touch sensor TS to transfer a voltage of the touch sensor TS to the reference line REFL. A gate electrode of the touch transistor TTR may be connected to the second scan line SCANL2, and its first electrode may be connected to the reference line REFL. In addition, a second electrode of the touch transistor TTR may be connected to the touch sensor electrode TSE of the touch sensor TS.

The reference line REFL may be connected to the AD converter ADC in accordance with a control signal. In detail, a second switch SW2 may connect or disconnect the AD converter ADC to or from the reference line REFL in accordance with a sampling control signal SAMP. When the second switch SW2 is turned on in accordance with the sampling control signal SAMP of a turn-on level, the reference line REFL may be connected to the AD converter ADC.

The touch transistor TTR may be turned on in response to the second scan signal Scan2 applied through the second scan line SCANL2. When the touch transistor TTR is turned on, the voltage of the touch sensor electrode TSE may be applied to the AD converter ADC through the reference line REFL. Also, when the second switch SW2 is turned off in response to the sampling control signal SAMP of a turn-off level, the reference line REFL may be separated from the AD converter ADC.

The first and second switching transistors TR1 and TR2, the driving transistor DTR, the capacitor Cst and the light emitting element OLED may be disposed in each of the circuit areas CA1, CA2, CA3 and CA4 of the first non-transmissive area NTA1. As shown in FIGS. 3 and 10, the touch transistor TTR may be provided to at least partially overlap the touch sensor TS.

In more detail, each of the plurality of touch sensors TS may be connected to the reference line REFL through the first touch connection portion TC1. The first touch connection portion TC1 may include a touch transistor TTR and a first touch contact electrode TCT1. The touch transistor TTR may include an active layer ACT2, a gate electrode GE2, a source electrode SE2 and a drain electrode DE2. In FIG. 10, the active layer ACT2, the gate electrode GE2, the source electrode SE2 and the drain electrode DE2 of the touch transistor TTR are disposed to overlap the touch sensor electrode TSE, but are not limited thereto. In another embodiment, at least a portion of the drain electrode DE2 and the active layer ACT2 of the touch transistor TTR may overlap the touch sensor electrode TSE, and the gate electrode GE2 and the source electrode SE2 of the touch transistor TTR may not overlap the touch sensor electrode TSE.

The gate electrode GE2 of the touch transistor TTR may be connected to the second scan line SCANL2. In detail, the gate electrode GE2 of the touch transistor TTR may be connected to the second scan line SCANL2 through a first connection electrode CE1. One end of the first connection electrode CE1 may be connected to the second scan line SCANL2 through a tenth contact hole CH10, and the other end thereof may be connected to the gate electrode GE2 through an eleventh contact hole CH11.

The active layer ACT2 of the touch transistor TTR may be provided below the gate electrode GE2 to at least partially overlap the gate electrode GE2. One end of the active layer ACT2 may be connected to the source electrode SE2 through a seventh contact hole CH7, and the other end thereof may be connected to the drain electrode DE2 through an eighth contact hole CH8.

One end of the source electrode SE2 of the touch transistor TTR may be connected to the reference line REFL through a sixth contact hole CH6, and the other end thereof may be connected to the active layer ACT2 through the seventh contact hole CH7. One end of the drain electrode DE2 of the touch transistor TTR may be connected to the active layer ACT2 through the eighth contact hole CH8, and the other end thereof may be connected to the first touch contact electrode TCT1 through a ninth contact hole CH9.

The first touch contact electrode TCT1 may be provided in the transmissive area TA. The first touch contact electrode TCT1 may be disposed between the drain electrode DE2 of the touch transistor TTR and the touch sensor electrode TSE to electrically connect the drain electrode DE2 with the touch sensor electrode TSE.

In addition, a portion of an upper surface of the first touch contact electrode TCT1 may be exposed by a second undercut structure UC2, and the touch sensor electrode TSE may be connected to the exposed upper surface. In detail, the first touch contact electrode TCT1 may be formed in a layer provided between the buffer layer BF and the second passivation layer PAS2. In one embodiment, the first touch contact electrode TCT1 may be disposed between the first passivation layer PAS1 and the second passivation layer PAS2. In this case, the second passivation layer PAS2 may be provided with a second opening area OA2 that is formed to expose at least a portion of the upper surface of the first touch contact electrode TCT1. The second undercut structure UC2 may be provided such that the planarization layer PLN is more protruded than the second passivation layer PAS2 in the second opening area OA2 of the second passivation layer PAS2. Therefore, the second undercut structure UC2 may expose at least a portion of the lower surface of the planarization layer PLN, and may expose at least a portion of the upper surface of the first touch contact electrode TCT1 without having the second passivation layer PAS2 below the exposed lower surface. The second undercut structure UC2 may be provided inside the area where the first undercut structure UC1 is provided. That is, the second undercut structure UC2 may be disposed in the area in which the touch sensor TS is provided.

The touch sensor electrode TSE may be deposited on the exposed upper surface of the first touch contact electrode TCT1 to form a first contact area CTA1, and may be electrically connected to the first touch contact electrode TCT1.

Each of the plurality of touch sensors TS may be connected to the touch bridge line TBL through the second touch connection portion TC2 as shown in FIGS. 3, 12 and 13. The second touch connection portion TC2 may at least partially overlap the touch sensor TS at one end, and may at least partially overlap the touch bridge line TBL at the other end to connect the touch sensor TS with the touch bridge line TBL. The second touch connection portion TC2 may include a high resistance line HRL, a first connection electrode CE1, a touch connection line TCL, a second connection electrode CE2 and a second touch contact electrode TCT2.

The high resistance line HRL may be disposed between the first undercut structure UC1 and the touch bridge line TBL. One end of the high resistance line HRL may be connected to the touch bridge line TBL through a twelfth contact hole CH12, and the other end thereof may be connected to the second connection electrode CE2 through a thirteenth contact hole CH13. In FIGS. 12 and 13, the high resistance line HRL is shown as being connected to the touch connection line TCL through the second connection electrode CE2, but is not limited thereto. In another embodiment, the high resistance line HRL may be directly connected to the touch connection line TCL.

The high resistance line HRL may include high resistance to detect a defective touch sensor TS. The transparent display panel 110 according to one embodiment of the present disclosure may detect a defective touch sensor by using the high resistance R.

In detail, as described above, particles PRT may occur in the first undercut structure UC1, and the touch sensor electrode TSE of the touch sensor TS and the cathode electrode CE of the light emitting element may be electrically connected to each other without being separated from each other. When respective voltages different from each other are applied to the touch line TL and the common power line VSSL as shown in FIG. 14, a current flows from the touch sensor electrode TSE to the cathode electrode CE.

For example, a first voltage, e.g., 20V, may be applied to the touch line TL, and a second voltage, e.g., 0V, may be applied to the common power line VSSL. Since the touch sensor electrode TSE is electrically connected with the cathode electrode CE of the light emitting element, a current path CP may be generated from a touch sensor electrode TSE of a defective touch sensor TS3 to the cathode electrode CE. At this time, if the high resistance R is provided on the current path CP, a voltage of the defective touch sensor TS3 is reduced by the high resistance R. On the other hand, since no current flows to a touch sensor electrode TSE of normal touch sensors TS1, TS2 and TS4, the voltage applied from the touch line TL may be maintained in the normal touch sensors TS1, TS2 and TS4.

When the second switch SW2 is turned on in response to the sampling control signal SAMP of the turn-on level, the reference line REFL may be connected to the AD converter ADC. The touch transistors TTR respectively connected to the plurality of touch sensors TS1, TS2, TS3, . . . may be sequentially turned on in accordance with the second scan signal Scan2 applied through the second scan line SCANL2. When the touch transistor TTR is turned on, the voltage of the touch sensor electrode TSE may be applied to the AD converter ADC through the reference line REFL. The AD converter ADC may convert the voltage of the touch sensor electrode TSE into digital sensing data and output the digital sensing data to a defect detector 210. In this case, the defect detector 210 may be an element included in an external circuit board (not shown), or may be an element included in an external defect inspection equipment.

The defect detector 210 may detect the defective touch sensor TS3 based on a voltage difference of the plurality of touch sensors TS1, TS2, TS3, . . . . In detail, the voltage of the defective touch sensor TS3 may be smaller than that of the normal touch sensors TS1, TS2, TS4, TS5 and TS6 as shown in FIG. 15. The voltage of the normal touch sensors TS1, TS2, TS4, TS5 and TS6 may have a voltage, e.g., 10V, which is reduced by line resistance of the touch line TL from a first voltage, e.g., 20V, which is applied to the touch line TL. On the other hand, the voltage of the defective touch sensor TS3 may have a voltage, e.g., 3V, which is reduced by line resistance of the touch line TL and the high resistance R from the first voltage, e.g., 20V, which is applied to the touch line TL. The defect detector 210 may determine a touch sensor TS, of which voltage sensed through the reference line REFL is smaller than a reference value, as a defective touch sensor.

The transparent display panel 110 according to one embodiment of the present disclosure should include high resistance R to generate a voltage difference between the defective touch sensor TS3 and the normal touch sensors TS1, TS2, TS4, TS5 and TS6. Referring to FIG. 15, when the resistance R is 0Ω, the voltage difference between the defective touch sensor TS3 and the normal touch sensors TS1, TS2, TS4, TS5 and TS6 is not generated, so that it is difficult to detect the defective touch sensor TS3. Meanwhile, the voltage difference between the defective touch sensor TS3 and the normal touch sensors TS1, TS2, TS4, TS5 and TS6 may be increased as the resistance R is increased. FIG. 15 shows voltages of the defective touch sensor TS3 and the normal touch sensors TS1, TS2, TS4, TS5 and TS6 when the resistance R is 1 kΩ (R2) and the resistance R is 1 MΩ (R2). It is noted from FIG. 15 that the voltage difference between the defective touch sensor TS3 and the normal touch sensors TS1, TS2, TS4, TS5 and TS6 when the resistance R is 1 MΩ is greater than that when the resistance R is 1 kΩ. That is, the transparent display panel 110 according to one embodiment of the present disclosure may more easily detect the defective touch sensor TS3 as the resistance R becomes high.

The high resistance line HRL may be made of a silicon-based semiconductor material or oxide-based semiconductor material, which has high resistance, to implement high resistance. For example, the high resistance line HRL may include the same material as that of the active layer ACT1 of the driving transistor DTR in the same layer as the active layer ACT1.

The second connection electrode CE2 may electrically connect the high resistance line HRL and the touch connection line TCL. The second connection electrode CE2 may be disposed in a layer provided between the high resistance line HRL and the touch connection line TCL. In one embodiment, the second connection electrode CE2 may be disposed in the same layer as the source electrode SE1 and the drain electrode DE1 of the driving transistor DTR.

The touch connection line TCL may be disposed between the high resistance line HRL and the second touch contact electrode TCT2 to electrically connect the high resistance line HRL with the second touch contact electrode TCT2. One end of the touch connection line TCL may be connected to the second connection electrode CE2 through a fourteenth contact hole CH14, and may be electrically connected to the high resistance line HRL through the second connection electrode CE2. Also, the other end of the touch connection line TCL may be connected to a third connection electrode CE3 through a fifteenth contact hole CH15, and may be electrically connected to the second touch contact electrode TCT2 through the third connection electrode CE3, but the touch connection line TCL is not limited thereto. The touch connection line TCL may be directly connected to the second touch contact electrode TCT2.

The touch connection line TCL may be formed in a layer provided between the first substrate 111 and the driving transistor DTR. In one embodiment, the touch connection line TCL may include the same material as that of the light shielding layer LS in the same layer as the light shielding layer LS. The touch connection line TCL may be extended across the first undercut structure UC1. The first undercut structure UC1 may be formed through a wet etching process. In the transparent display panel 110 according to one embodiment of the present disclosure, the touch connection line TCL may be provided in the same layer as the light shielding layer LS so that the touch connection line TCL may be prevented from being lost in the wet etching process for forming the first undercut structure UC1.

The third connection electrode CE3 may electrically connect the touch connection line TCL with the second touch contact electrode TCT2. The third connection electrode CE3 may be disposed in a layer provided between the touch connection line TCL and the second touch contact electrode TCT2. In one embodiment, the third connection electrode CE3 may be disposed in the same layer as the source electrode SE1 and the drain electrode DE1 of the driving transistor DTR.

The second touch contact electrode TCT2 may be provided in the transmissive area TA. The second touch contact electrode TCT2 may be disposed between the touch connection line CL and the touch sensor electrode TSE to electrically connect the touch connection line CL with the touch sensor electrode TSE. The second touch contact electrode TCT2 may be connected to the third connection electrode CE3 through a sixteenth contact hole CH16, and may be electrically connected to the touch connection line TCL through the third connection electrode CE3.

Also, at least a portion of an upper surface of the second touch contact electrode TCT2 may be exposed by a third undercut structure UC3, and the touch sensor electrode TSE may be connected to the exposed upper surface. In detail, the second touch contact electrode TCT2 may be formed in a layer provided between the buffer layer BF and the second passivation layer PAS2. In one embodiment, the second touch contact electrode TCT2 may be provided between the first passivation layer PAS1 and the second passivation layer PAS2. In this case, the second passivation layer PAS2 may be provided with a third opening area OA3 that is provided to expose at least a portion of the upper surface of the second touch contact electrode TCT2. The third undercut structure UC3 may be formed in such a manner that the planarization layer PLN is more protruded than the second passivation layer PAS2 in the third opening area OA3 of the second passivation layer PAS2. Therefore, the third undercut structure UC3 may expose at least a portion of the lower surface of the planarization layer PLN, and may expose at least a portion of the upper surface of the second touch contact electrode TCT2 without having the second passivation layer PAS2 below the exposed lower surface. The third undercut structure UC3 may be provided inside the area in which the first undercut structure UC1 is provided. That is, the third undercut structure UC3 may be disposed in the area in which the touch sensor TS is provided.

The touch sensor electrode TSE may be deposited on the exposed upper surface of the second touch contact electrode TCT2 to form a second contact area CTA2, and may be electrically connected to the second touch contact electrode TCT2. The second touch contact electrode TCT2 may transfer a change in capacitance of the touch sensor electrode TSE to the touch line TL through the touch connection line TCL, the high resistance line HRL and the touch bridge line TBL.

In the transparent display panel 110 according to one embodiment of the present disclosure, as shown in FIG. 8, the touch sensor electrode TSE of the touch sensor TS and the cathode electrode CE of the light emitting element may be electrically connected to each other by particles PRT. In the transparent display panel 110 according to one embodiment of the present disclosure, when the defective touch sensor TS is detected, the second touch connection portion TC2 for connecting the defective touch sensor TS with the touch bridge line TBL may be subjected to laser cutting, so that the defective touch sensor TS and the touch bridge line TBL may be electrically separated from each other. As are result, the other touch sensors TS of the corresponding touch block TB may be normally operated.

In the transparent display panel 110 according to one embodiment of the present disclosure, the high resistance line HRL may be cut from the second touch connection portion TC2 by laser as shown in FIG. 16. The high resistance line HRL may be made of a silicon-based semiconductor material or an oxide-based semiconductor material. The silicon-based semiconductor material or the oxide-based semiconductor material is likely to be more thermally condensed than a metal material such as Cu during laser irradiation, thereby generating high heat. Therefore, the silicon-based semiconductor material or the oxide-based semiconductor material may be better cut than other metal materials. That is, in the transparent display panel 110 according to one embodiment of the present disclosure, the high resistance line HRL made of a silicon-based semiconductor material or an oxide-based semiconductor material may be subjected to laser cutting to certainly make sure of the electrical isolation between the defective touch sensor TS and the touch bridge line TBL.

Also, in the transparent display panel 110 according to one embodiment of the present disclosure, the high resistance line HRL provided in the same layer as the active layer ACT1 of the driving transistor DTR may be subjected to laser cutting, so that a repair may be performed without damaging the light emitting element provided over the high resistance line HRL.

Meanwhile, the transparent display panel 110 according to one embodiment of the present disclosure may further include a metal pattern M provided to overlap at least a portion of the high resistance line HRL. Since the high resistance line HRL is made of a transparent silicon-based semiconductor material or oxide-based semiconductor material, it is difficult to identify an exact position of the high resistance line HRL in the transparent display panel 110. Therefore, in the transparent display panel 110 according to one embodiment of the present disclosure, a metal pattern M may be provided to overlap at least a portion of the high resistance line HRL, particularly a laser cutting line. In the transparent display panel 110 according to one embodiment of the present disclosure, the metal pattern M is formed of an opaque metal, so that an area to be irradiated with a laser may be easily detected during a repair process.

In the transparent display panel 110 according to one embodiment of the present disclosure, the metal pattern M may be provided over the high resistance line HRL. In the transparent display panel 110 according to one embodiment of the present disclosure, the laser may be irradiated to the lower surface of the first substrate 111 to cut the high resistance line HRL. At this time, the transparent display panel 110 according to one embodiment of the present disclosure may prevent laser reflection and energy loss from occurring through the metal pattern M provided over the high resistance line HRL. Therefore, the transparent display panel 110 according to one embodiment of the present disclosure may make sure of stability of the repair process.

Meanwhile, in the transparent display panel 110 according to one embodiment of the present disclosure, the metal pattern M may be provided between the first passivation layer PAS1 and the second passivation layer PAS2. The metal pattern M is not electrically connected to the high resistance line HRL, and may be a metal pattern that is electrically floated. When the metal pattern M is electrically connected to the high resistance line HRL, resistance of the high resistance line HRL may be lowered, whereby high resistance may not be obtained. Therefore, the metal pattern M may be insulated from the high resistance line HRL.

In the transparent display panel 110 according to one embodiment of the present disclosure, particles may occur between the metal pattern M and the high resistance line HRL during the manufacturing process. When a distance between the metal pattern M and the high resistance line HRL is not sufficient, the metal pattern M and the high resistance line HRL may be short-circuited in the area in which particles occur.

In the transparent display panel 110 according to one embodiment of the present disclosure, the metal pattern M may be provided between the first passivation layer PAS1 and the second passivation layer PAS2 to make sure of a sufficient distance between the metal pattern M and the high resistance line HRL, and a short between the metal pattern M and the high resistance line HRL may be prevented from occurring even though particles occur between the metal pattern M and the high resistance line HRL.

The transparent display panel 110 according to one embodiment of the present disclosure may easily detect a defective touch sensor in units of pixels by using the touch transistor TTR and the resistance R. At this time, in the transparent display panel 110 according to one embodiment of the present disclosure, the touch transistor TTR may be connected to the existing reference line REFL to sense the voltage of the touch sensor TS through the reference line REFL. That is, in the transparent display panel 110 according to one embodiment of the present disclosure, since a separate signal line for sensing the voltage of the touch sensor TS is not added, transmittance of the touch sensor TS may be more improved than the structure in which the voltage of the touch sensor TS is sensed using a separate sensing line.

In addition, in the transparent display panel 110 according to one embodiment of the present disclosure, the touch transistor TTR is connected to the second scan line SCANL2, so that the defective touch sensor may be independently detected without overlapping the display driving timing.

According to the present disclosure, the following advantageous effects may be obtained.

In the present disclosure, the touch sensor electrode of the touch sensor and the cathode electrode of the light emitting element are formed using the undercut structure at the same time, so that the touch process may be simplified and a separate mask for the touch sensor electrode is not additionally required.

Also, in the present disclosure, the defective touch sensor may be easily detected in pixel units using the touch transistor and the resistance.

Also, in the present disclosure, the touch transistor may be connected to the existing reference line, so that the voltage of the touch sensor may be sensed through the reference line. Therefore, since a separate signal line for sensing the voltage of the touch sensor is not additionally provided, transmittance of the touch sensor may be more improved than the structure in which the voltage of the touch sensor TS is sensed using a separate sensing line.

Also, in the present disclosure, the touch transistor is connected to a separate scan line, so that the defective touch sensor may be independently detected without overlapping the display driving timing.

It will be apparent to those skilled in the art that the present disclosure described above is not limited by the above-described embodiments and the accompanying drawings and that various substitutions, modifications and variations can be made in the present disclosure without departing from the spirit or scope of the disclosures. Consequently, the scope of the present disclosure is intended to cover all variations or modifications derived from the meaning, scope and equivalent concept of the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transparent display device comprising:
a substrate provided with a plurality of transmissive areas through which externally incident light passes and a non-transmissive area disposed between the transmissive areas adjacent to each other;
a plurality of touch sensors respectively provided in the plurality of transmissive areas over the substrate, each touch sensor of the plurality of touch sensors including a touch sensor electrode;
a plurality of pixels provided in the non-transmissive area over the substrate, each pixel of the plurality of pixels including a plurality of subpixels;
a plurality of driving transistors respectively electrically connected to the plurality of subpixels;
a plurality of touch transistors respectively electrically connected to the plurality of touch sensors;
a reference line configured to apply a reference voltage to the plurality of driving transistors;
a first scan line configured to supply a first scan signal to transistors respectively electrically connected to the plurality of driving transistors; and
a second scan line configured to supply a second scan signal to each of the plurality of touch transistors,
wherein each of the plurality of touch transistors is electrically connected to the reference line and electrically connected to the touch sensor electrode.

2. The transparent display device of claim 1, further comprising a first switch electrically connecting or disconnecting a reference voltage source to or from the reference line based on an initialization control signal.

3. The transparent display device of claim 1, wherein the transistors respectively electrically connected to the plurality of driving transistors include:
a first transistor configured to charge a data voltage supplied from a data line in a capacitor based on the first scan signal supplied to the first scan line; and
a second transistor configured to transfer a reference voltage applied from the reference line to the driving transistor based on the first scan signal supplied to the first scan line.

4. The transparent display device of claim 1, further comprising a first touch contact electrode provided between a drain electrode of the touch transistor and the touch sensor electrode to electrically connect the drain electrode of the touch transistor with the touch sensor electrode.

5. The transparent display device of claim 4, wherein the drain electrode of the touch transistor and the first touch contact electrode at least partially overlap the touch sensor electrode.

6. The transparent display device of claim 1, further comprising:
a plurality of touch lines provided in the non-transmissive area over the substrate and extended in a first direction;
a plurality of touch bridge lines provided in the non-transmissive area over the substrate and extended in a second direction to be electrically connected to one of the plurality of touch lines; and
a plurality of touch connection portions electrically connecting the plurality of touch bridge lines with the plurality of touch sensors.

7. The transparent display device of claim 6, wherein the plurality of touch connection portions includes a high resistance area.

8. The transparent display device of claim 6, wherein each of the plurality of touch connection portions includes:
a second touch contact electrode disposed to at least partially overlap the touch sensor electrode, being in contact with the touch sensor electrode; and
a touch connection line having one end electrically connected to the second touch contact electrode and extended toward the touch bridge line.

9. The transparent display device of claim 8, wherein each of the plurality of touch connection portions further comprises a high resistance line being electrically connected to a touch sensor.

10. The transparent display device of claim 9, wherein the high resistance line is made of a same material as that of an active layer of the driving transistor.

11. The transparent display device of claim 8, wherein each of the plurality of touch connection portions further comprises a high resistance line electrically connecting the touch connection line with the touch bridge line.

12. The transparent display device of claim 1, wherein each of the plurality of subpixels includes an anode electrode, a light emitting layer, and a cathode electrode, and
wherein the cathode electrode constituting a light emitting element is disposed in a same layer as the touch sensor electrode constituting the touch sensor.

13. The transparent display device of claim 12, further comprising a first undercut structure provided in the transmissive area,
wherein the cathode electrode and the touch sensor electrode are separated from each other by the first undercut structure.

14. The transparent display device of claim 13, wherein the first undercut structure has a planar closed shape.

15. The transparent display device of claim 1, further comprising:
a common power line configured to supply a voltage to a cathode electrode constituting a light emitting element;
a touch line configured to supply a voltage to the touch sensor electrode; and
a defect detector configured to:
control a first voltage and a second voltage to be applied to the common power line and the touch line, respectively,
sense a voltage of each of the touch sensors through the reference line, and
determine a defective touch sensor among the touch sensors based on the sensed voltage of each of the touch sensors.

16. The transparent display device of claim 15, wherein the defect detector is configured to determine a touch sensor, of which voltage sensed through the reference line has a value smaller than a reference value, as the defective touch sensor.

\* \* \* \* \*